(12) United States Patent
Allen et al.

(10) Patent No.: US 11,853,738 B2
(45) Date of Patent: Dec. 26, 2023

(54) UPGRADE INFRASTRUCTURE WITH INTEGRATION POINTS

(71) Applicant: Dell Products L.P., Hopkinton, MA (US)

(72) Inventors: Patricia Lee Allen, Hollis, NH (US); Charles C. Bailey, Cary, NC (US); Carole Ann Gelotti, Hudson, NH (US)

(73) Assignee: Dell Products L.P., Hopkinton, MA (US)

( * ) Notice: Subject to any disclaimer, the term of this patent is extended or adjusted under 35 U.S.C. 154(b) by 71 days.

(21) Appl. No.: 17/502,094

(22) Filed: Oct. 15, 2021

(65) Prior Publication Data

US 2023/0123554 A1   Apr. 20, 2023

(51) Int. Cl.
   *G06F 9/445*   (2018.01)
   *G06F 8/65*    (2018.01)

(52) U.S. Cl.
   CPC ...................................... *G06F 8/65* (2013.01)

(58) Field of Classification Search
   CPC .......... G06F 8/65; G06F 18/00; G06F 18/214; G06F 16/2379; G06F 11/3688; G06F 40/197
   USPC .................................................. 717/168–178
   See application file for complete search history.

(56) References Cited

U.S. PATENT DOCUMENTS 9,342,291 B1 * 5/2016 Guo .......................... G06F 8/65

OTHER PUBLICATIONS

U.S. Appl. No. 17/364,927, filed Jul. 1, 2021, entitled Meta Data Driven Upgrades, to Alex Kulakovsky, et al.
U.S. Appl. No. 17/506,196, filed Oct. 20, 2021, entitled Upgrade Infrastructure With Integration Points, to Patricia Lee Allen, et al.
U.S. Appl. No. 17/970,996, filed Oct. 21, 2022, entitled Upgrade Infrastructure With Integration Points Having Dynamically Determined Callbacks, to Patricia Lee Allen, et al.

* cited by examiner

*Primary Examiner* — Chuck O Kendall
(74) *Attorney, Agent, or Firm* — Muirhead and Saturnelli, LLC

(57) ABSTRACT

Techniques for performing an upgrade can include: defining integration points, each associated with a workflow processing point of an upgrade workflow; associating code entities with the integration points; and performing processing that performs the upgrade workflow to upgrade a system, wherein the upgrade includes upgrading a first feature, facility or service of the system from a current version to a new version, wherein the processing further includes: executing code corresponding to workflow processing points of the upgrade workflow, wherein a first workflow processing point of the upgrade workflow is associated with a first of the integration points; and in response to said executing reaching the first workflow processing point corresponding to the first integration point, invoking a first code entity associated with the first integration point, wherein said first code entity performs customized processing in connection with upgrading the first feature, facility or service in the system.

19 Claims, 5 Drawing Sheets

UPGRADE INFRASTRUCTURE WITH INTEGRATION POINTS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, which are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems typically do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system includes one or more processors, and a memory comprising code that, when executed, performs the method. The non-transitory computer readable medium includes code stored thereon that, when executed, performs the method. The method comprises: defining a plurality of integration points, wherein each of the plurality of integration points is associated with one of a first plurality of workflow processing points included in an upgrade workflow; associating each of a plurality of code entities with a corresponding one of the plurality of integration points; and performing first processing that performs the upgrade workflow to upgrade a system, wherein the upgrade includes upgrading a first feature, facility or service of the system from a current version to a new version, wherein the first processing further includes: executing first executable code corresponding to the first plurality of workflow processing points, wherein a first workflow processing point of the first plurality is associated with a first integration point of the plurality of integration points; and in response to said executing reaching the first workflow processing point corresponding to the first integration point, invoking a first of the plurality of code entities associated with the first integration point, wherein said first code entity performs first customized processing in connection with upgrading the first feature, facility or service in the system.

In at least one embodiment, the first plurality of workflow processing points can correspond to a plurality of first entry points in the first executable code of an upgrade infrastructure, and wherein the upgrade infrastructure can perform the first processing to implement the upgrade workflow. Performing the step of associating can specify execution or runtime linkages between the plurality of code entities and the plurality of integration points, and wherein the plurality of code entities can be user-provided code entities not included in the upgrade infrastructure. Each of said plurality of code entities, which corresponds to one of the plurality of integration points associated with one of the plurality of integration points, can be a callback routine or code module invoked in said first processing by the first executable code of the upgrade infrastructure in response to the first executable code of the upgrade infrastructure reaching said one integration point during the first processing. The first integration point can correspond to a point in the upgrade workflow where a pre-upgrade health check of the system is performed. The pre-upgrade health check can include a first condition that must be met in order for the upgrade workflow to continue, and wherein the first code entity can perform processing that determines whether the first condition is met in order to continue with the upgrade workflow.

In at least one embodiment, the plurality of integration points can include a second integration point in the upgrade workflow occurring after the first integration point in the upgrade workflow, wherein at the second integration point a preparatory task can be performed prior to upgrading the first feature, service or facility on the system. The preparatory task can include disabling, pausing or stopping another feature, service or facility that is not required to run during the upgrading of the first feature, service or facility of the system, and wherein the preparatory task can be performed by a second of the plurality of code entities invoked in said first processing by the first executable code of the upgrade infrastructure in response to the first executable code of the upgrade infrastructure reaching said second integration point during the first processing.

In at least one embodiment, the plurality of integration points can include a third integration point in the upgrade workflow occurring after the second integration point in the upgrade workflow, wherein at the third integration point rollback processing can be performed in response to an occurrence of a system-wide rollback of the upgrade. The rollback processing can be performed by a third of the plurality of code entities invoked in said first processing by the first executable code of the upgrade infrastructure in response to the first executable code of the upgrade infrastructure reaching said third integration point during the first processing. The system can include a plurality of appliances each including a plurality of processing nodes.

In at least one embodiment, the plurality of integration points can include a fourth integration point occurring after the third integration point in the upgrade workflow. At the fourth integration point a structure or schema of a local database on each of the plurality of appliances can be updated. A fourth of the plurality of code entities can perform processing that includes updating the structure or schema of the local database on each of the plurality of appliances, and wherein the fourth code entity can be invoked in said first processing by the first executable code of the upgrade infrastructure in response to the first executable code of the upgrade infrastructure reaching said fourth integration point during the first processing.

In at least one embodiment, a first of the plurality of appliances can be a primary appliance including a primary copy of a system-wide database, wherein the plurality of integration points can include a fifth integration point occurring after the fourth integration point in the upgrade workflow. At the fifth integration point a structure or schema of the system-wide database on the primary appliances can be updated, wherein a fifth of the plurality of code entities can perform processing that includes updating the structure or schema of the system-wide database on the primary appliance. The fifth code entity can be invoked in said first processing by the first executable code of the upgrade infrastructure in response to the first executable code of the upgrade infrastructure reaching said fourth integration point during the first processing.

In at least one embodiment, the first feature, service or facility can be required to run during the upgrading of the first feature, service or facility, wherein the plurality of integration points can include a sixth integration point occurring after the fifth integration point in the upgrade workflow. The sixth integration point can correspond to a point in the upgrade workflow after software of the first feature, service or facility on the primary appliance has been upgraded from the current version to the new version and after the structure or schema of the system-wide database on the primary appliance has been updated at the fifth integration point. The sixth integration point can correspond to a point in the upgrade workflow where the first feature, service or facility is started and executes in a compatibility mode in accordance with a runtime behavior of the current version of the first feature, service or facility. A sixth of the plurality of code entities can perform processing that includes starting or running the first feature, service or facility in the compatibility mode of the current version. The sixth code entity can be invoked in said first processing by the first executable code of the upgrade infrastructure in response to the first executable code of the upgrade infrastructure reaching said sixth integration point during the first processing.

In at least one embodiment, the plurality of integration points can include a seventh integration point occurring after the sixth integration point in the upgrade workflow. At the seventh integration point custom integration work for the first feature, service or facility can be performed locally on each of the plurality of appliances after the first feature, facility or service has been upgraded on said each appliance. A seventh of the plurality of code entities can perform processing including said custom integration work, and wherein the seventh code entity can be invoked in said first processing by the first executable code of the upgrade infrastructure in response to the first executable code of the upgrade infrastructure reaching said seventh integration point during the first processing.

In at least one embodiment, the plurality of integration points can include an eighth integration point occurring after the seventh integration point in the upgrade workflow, and can include a ninth integration point occurring after the eighth integration point in the upgrade workflow. At the eight integration point a third feature, service or facility can be stopped, paused or disabled. At the ninth integration point an additional modification can be made to the structure or schema of the system-wide database. An eighth of the plurality of code entities can perform processing that includes stopping, pausing or disabling the third feature service or facility which accesses the system-wide database, and wherein the eighth code entity can be invoked in said first processing by the first executable code of the upgrade infrastructure in response to the first executable code of the upgrade infrastructure reaching said eighth integration point during the first processing. A ninth of the plurality of code entities can perform processing that includes implementing the additional modification to the structure or schema of the system-wide database, and wherein the ninth code entity can invoked in said first processing by the first executable code of the upgrade infrastructure in response to the first executable code of the upgrade infrastructure reaching said ninth integration point during the first processing.

In at least one embodiment, the plurality of integration points can include a tenth integration point occurring after the ninth integration point in the upgrade workflow. At the tenth integration point processing can be performed to migrate or transform data stored in the system-wide database from a prior version of the structure or schema to an updated version of the structure or schema in accordance with processing performed by the ninth code entity at the ninth integration point. A tenth of the plurality of code entities can perform processing that includes migrating or transforming the data stored in the system-wide database from the prior version of the structure or schema to the updated version of the structure or schema, and wherein the tenth code entity can be invoked in said first processing by the first executable code of the upgrade infrastructure in response to the first executable code of the upgrade infrastructure reaching said tenth integration point during the first processing.

In at least one embodiment, the plurality of integration points can include an eleventh integration point occurring after the tenth integration point in the upgrade workflow. At the eleventh integration point processing can performed to install a new feature, service or facility on the system, wherein the new feature, service or facility may not currently have an existing version installed on the system. An eleventh of the plurality of code entities can perform processing that includes installing the new features, service or facility on the system, and wherein the eleventh code entity can be invoked in said first processing by the first executable code of the upgrade infrastructure in response to the first executable code of the upgrade infrastructure reaching said eleventh integration point during the first processing.

In at least one embodiment, the plurality of integration points can include a twelfth integration point occurring after the eleventh integration point in the upgrade workflow. At the twelfth integration point processing can be performed to configure a location of a control or management path on a selected one of the plurality of nodes of at least one of the plurality of appliances. A twelfth of the plurality of code entities can perform processing that includes configuring the location of the control or management path on the selected one of the plurality of nodes of the at least one of the plurality of appliances, and wherein the twelfth code entity can be invoked in said first processing by the first executable code of the upgrade infrastructure in response to the first executable code of the upgrade infrastructure reaching said twelfth integration point during the first processing.

In at least one embodiment, the plurality of integration points can include a thirteenth integration point occurring after the twelfth integration point in the upgrade workflow. At the thirteenth integration point processing can be performed to restart any feature, service or facility previously disabled, paused or stopped in connection with any of the second integration point and the eighth integration point, and wherein at the thirteen integration point processing can be performed to enable one or more features, services and facilities, including the first feature, service or facility, which were upgraded in the system during the first processing by said executing the first executable code. A thirteenth of the plurality of code entities can perform processing that includes restarting any feature, service or facility previously disabled, paused or stopped in connection with any of the second integration point and the eighth integration point. The thirteenth code entity can further perform processing that includes enabling one or more features, services and facilities, including the first feature, service or facility, which were upgraded in the system during the first processing by said executing the first executable code, and wherein the thirteenth code entity is invoked in said first processing by the first executable code of the upgrade infrastructure in response to the first executable code of the upgrade infrastructure reaching said thirteenth integration point during the first processing.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
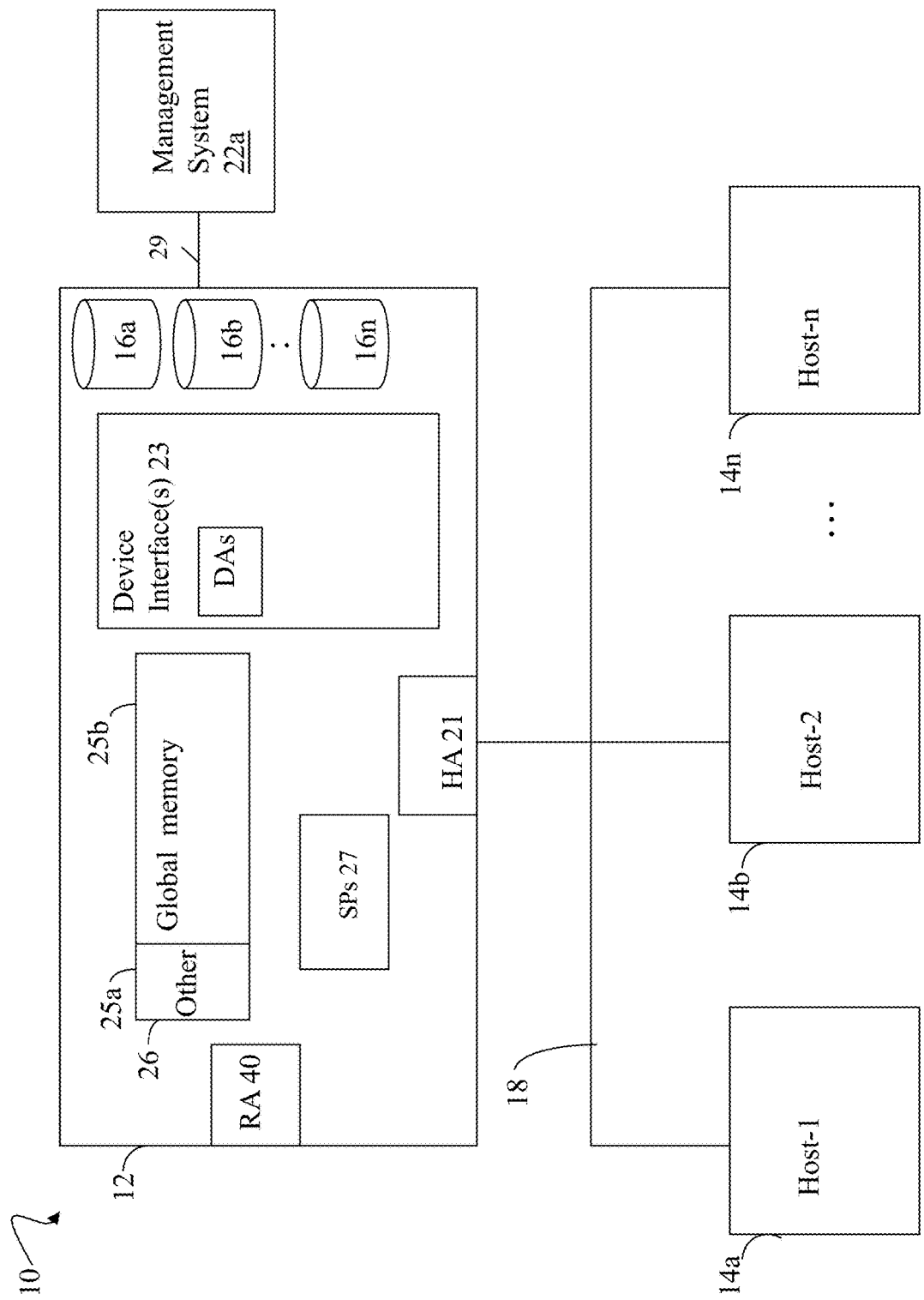
FIGS. 1 and 3 are examples of components included in a system in accordance with the techniques of the present disclosure.

In at least one existing data storage system, a non-disruptive upgrade (NDU) can be performed where a data storage client, such as a host, is provided with continuous uninterrupted service and access to data stored on the data storage system. At least one such data storage system can include one or more dual node appliances providing high availability. If the system includes multiple dual node appliances, the multiple appliances can form a cluster or federation of the dual node appliances.

The NDU can be performed across the one or more appliances of the data storage system, for example, to upgrade existing software on all appliances of the system. One existing NDU technique can be characterized as a rolling upgrade because each appliance is upgraded and restarted, one after another, until all appliances in the systems have been upgraded. With the NDU, the data storage system can continue to provide uninterrupted service and access to the data while the software is being upgraded to the next version across all appliances of the system.

To provide uninterrupted service during the upgrade, complex coordination and orchestration of the upgrade processing is typically needed. For example, in at least one existing data storage system with a cluster of multiple dual node appliances, orchestration is needed to coordinate performing the upgrade across the multiple appliances. When upgrading each node of the appliance, the remaining peer node can handle the full workload (e.g., all I/Os, requests, and the like) of both nodes. Thus, different components are upgraded at different times throughout the complex upgrade procedure to ensure uninterrupted service providing data access and to maintain cluster high availability. However, providing the NDU also introduces complex dependencies between the different versions of software and data that can exist and run during the cluster upgrade. Upgrades can be complicated because, in addition to orchestrating the complex dependencies of a mixed version cluster, there can be many upgrade preconditions and postconditions to be satisfied in order to successfully complete the upgrade.

As a result, implementing an upgrade to a particular service, facility or feature, such as by a software developer, can be complex. The particular steps that a software developer needs to perform as well as when different types of upgrade work can be implemented during the upgrade workflow, process or cycle in a particular release often requires a deep understanding of the upgrade process, release content, and general system-wide architecture. Additionally, code performing an upgrade can also be required to be resilient, for example, to deal with failures, rollbacks, the ability to continue running in a failed or mixed version cluster upgrade, recovery and restarts of the upgrade. If upgrade work or processing is done incorrectly or misplaced in the upgrade workflow, the cluster upgrade can fail or become unstable which can cause downtime and data-loss. Such instability and data loss within a data storage system are generally undesirable and unacceptable due to the adverse impacts such as, for example, regarding a customer's ability to use the data storage system. Thus generally the amount of knowledge typically needed to properly implement a software upgrade can be beyond that of most developers. Additionally, the failure to properly perform upgrade processing work within the upgrade workflow can result in adverse, undesirable and unacceptable behavior.

Typically in existing systems, data storage system upgrades can be custom solutions designed to upgrade to a specific version of software. Feature upgrade work to a particular service or facility can be a best effort to add code for the upgrade without necessarily understanding the impact to other services or facilities, the overall upgrade process or to the system. Existing systems generally lack a specific infrastructure or framework for coordinating the different components of the system through the NDU process to prevent runtime errors, upgrade collisions among services and/or data, and coordination between dependencies. Existing upgrade procedures used by software development teams can rely on experience and working knowledge of the developers to implement an upgrade for a particular service or facility. Thus existing upgrade processes and procedures can be error prone and can result in leaving an existing system being upgraded in an undesirable and/or unpredictable state.

Accordingly, described in the following paragraphs are techniques which can be used to perform an upgrade or update in a system. The system can be a data storage system. In at least one embodiment, the data storage system can include one or more dual node appliances forming a cluster or federation. The upgrade or update can be a software upgrade or update and can be performed across the one or more appliances of the system. In at least one embodiment, the upgrade can be characterized as an NDU which is a rolling cluster upgrade where appliances of the system, and nodes of the appliances, can be upgraded in sequence. In at least one embodiment, the techniques of the present disclosure can use defined upgrade integration points which provide a defined structure to guide upgrades to data as well as upgrades to features, services or facilities through the complicated upgrade process.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the "n" hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
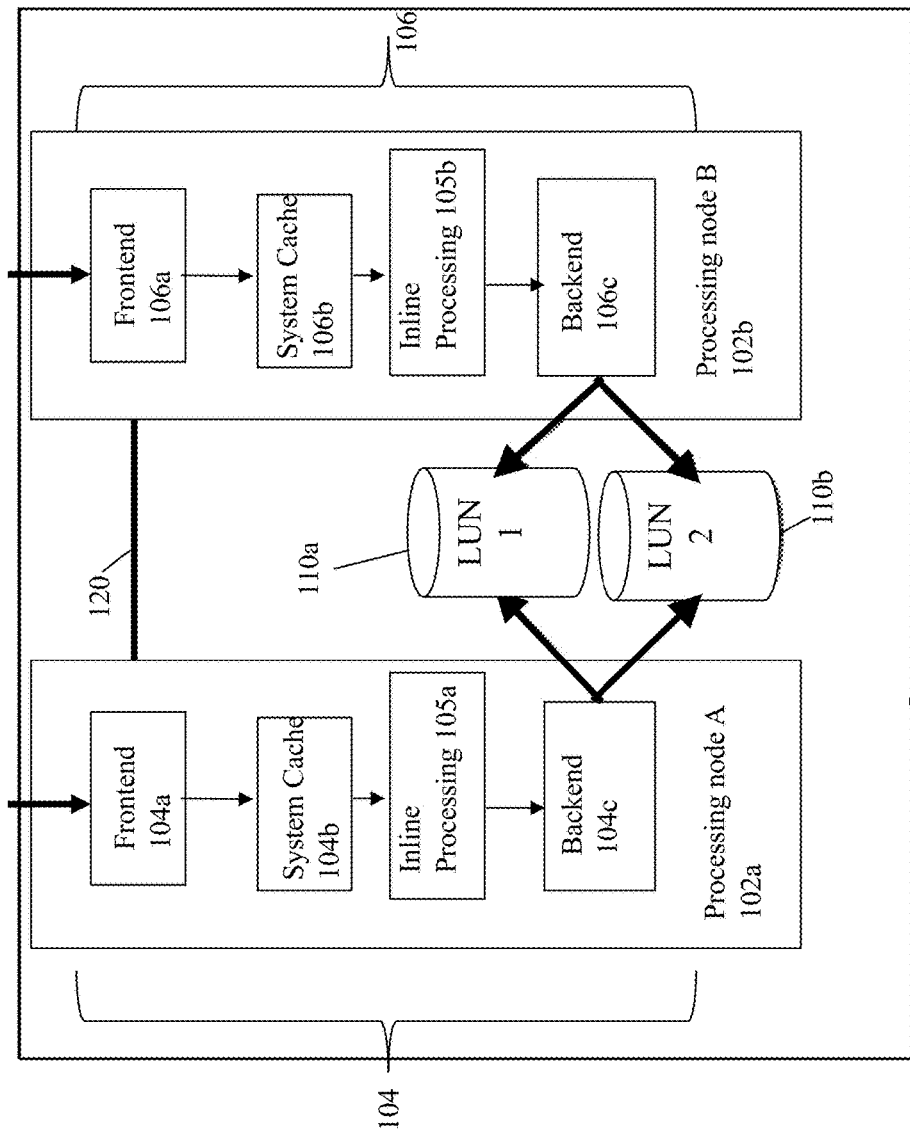
FIG. 2 is an example illustrating the I/O path or data path in connection with processing data in an embodiment in accordance with the techniques of the present disclosure.

With reference to the FIG. 2, shown is an example 100 illustrating components included in the data path in at least one existing data storage system in accordance with the techniques herein. The example 100 includes two processing nodes A 102a and B 102b and the associated software stacks 104, 106 of the data path, where I/O requests are received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing is performed by layer 105a. Such inline processing operations of 105a is optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing includes, for example, performing one or more data reduction operations such as data deduplication or data compression. The inline processing includes performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is directed to a location or logical address of a LUN and where data is read from, or written to, the logical address. The LUNs 110a, 110b are examples of storage objects representing logical storage entities included in an existing data storage system configuration. Since, in this example, writes, or more generally I/Os, directed to the LUNs 110a, 110b are received for processing by either of the nodes 102a and 102b, the example 100 illustrates what is also be referred to as an active-active configuration.

In connection with a write operation received from a host and processed by the processing node A 102a, the write data is written to the system cache 104b, marked as write pending (WP) denoting it needs to be written to the physical storage 110a, 110b and, at a later point in time, the write data is destaged or flushed from the system cache to the physical storage 110a, 110b by the BE component 104c. The write request is considered complete once the write data has been stored in the system cache whereby an acknowledgement regarding the completion is returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be optionally performed. For example, the inline processing can include performing data compression processing, data deduplication processing, and the like, that convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 is used for internode communication between the nodes 102a, 102b.

In connection with at least one embodiment in accordance with the techniques herein, each processor or CPU includes its own private dedicated CPU cache (also sometimes referred to as processor cache) that is not shared with other processors. In at least one embodiment, the CPU cache, as in general with cache memory, is a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache in at least one embodiment is substantially faster than the system RAM used as main memory, where the processor cache contains information that the processor will be immediately and repeatedly accessing. The faster memory of the CPU cache, for example, runs at a refresh rate that's closer to the CPU's clock speed, which minimizes wasted cycles. In at least one embodiment, there are two or more levels (e.g., L1, L2 and L3) of cache. The CPU or processor cache includes at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor is the closest of all cache levels (e.g., L1-L3) to the processor which stores copies of the data from frequently used main memory locations. Thus, the system cache as described herein includes the CPU cache (e.g., the L1 level cache or dedicated private CPU/processor cache) as well as other cache levels (e.g., the LLC) as described herein. Portions of the LLC are used, for example, to initially cache write data which is then flushed to the backend physical storage such as BE PDs providing non-volatile storage. For example, in at least one embodiment, a RAM based memory is one of the caching layers used as to cache the write data that is then flushed to the backend physical storage. When the processor performs processing, such as in connection with the inline processing 105a, 105b as noted above, data is loaded from the main memory and/or other lower cache levels into its CPU cache.

In at least one embodiment, the data storage system is configured to include one or more pairs of nodes, where each pair of nodes is generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure includes the minimum single pair of nodes and up to a specified maximum number of PDs. In some embodiments, a single base enclosure can be scaled up to have additional BE non-volatile storage using one or more expansion enclosures, where each expansion enclosure includes a number of additional PDs. Further, in some embodiments, multiple base enclosures are grouped together in a load-balancing cluster to provide up to the maximum number of node pairs. Consistent with other discussion herein, each node includes one or more processors and memory. In at least one embodiment, each node includes two multi-core processors with each processor of the node having a core count of between 8 and 28 cores. In at least one embodiment, the PDs are all non-volatile SSDs, such as flash-based storage devices and storage class memory (SCM) devices. It should be noted that the two nodes configured as a pair are also sometimes be referred to as peer nodes. For example, the node A 102a is the peer node of the node B 102b, and the node B 102b is the peer node of the node A 102a.

In at least one embodiment, the data storage system is configured to provide both block and file storage services with a system software stack that includes an operating system running directly on the processors of the nodes of the system.

In at least one embodiment, the data storage system is configured to provide block-only storage services (e.g., no file storage services). A hypervisor can be installed on each of the nodes to provide a virtualized environment of virtual machines (VMs). In at least one embodiment, the system software stack executes in the virtualized environment deployed on the hypervisor. In at least one embodiment, the system software stack (sometimes referred to as the software stack or stack) includes an operating system running in the context of a VM of the virtualized environment. Additional software components can be included in the system software stack and can also execute in the context of a VM of the virtualized environment.

In at least one embodiment, each pair of nodes is configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not be shared with other pairs of nodes. A host can access data stored on a BE PD through the node pair associated with, or attached to, the PD.

In at least one embodiment, each pair of nodes provides a dual node architecture where both nodes of the pair are generally identical in terms of hardware and software for redundancy and high availability. Consistent with other discussion herein, each node of a pair performs processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair includes its own resources such as its own local (i.e., used only by the node) resources such as local processor(s), local memory, and the like.

In at least one embodiment, a data storage system can include one or more storage appliances where each such appliance is a dual node appliance such as described in connection with FIG. 2. In such an embodiment, each appliance can be a dual node appliance including two processing nodes 102a-b which communicate with each other over an internal network connection or interconnect 120 between the nodes 102a, 102b.

In at least one embodiment, each of the nodes 102a-b can be configured with one or more internal disk drives used only by that particular node. The internal disk drives of the nodes can be, for example, non-volatile solid state drives. For example, the node 102a can be configured with one or more internal disk drives used only by the node 102a. An internal disk drive of each of the nodes 102a-b can be used as the main boot device for the node. For example, a first internal disk drive of the node 102a can be used as the main boot device of the node 102a, and a second internal disk drive of the node 102b can be used as the main boot device of the node 102b. Each of the two nodes 102a-b can boot up and operate independently of the other node. In this case, the dual node architecture provides high availability for the single appliance including the nodes 102a-b in that, for example, if one of the nodes 102a-b is offline, down or generally unable to service requests, such as I/O operations, the other one of the nodes 102a-b which remains healthy and operable can still service and handle requests, such as I/O requests for LUNs having storage configured on BE PDs accessible only to the single appliance. Thus, with a dual node appliance, the appliance provides high availability in that the appliance can continue to service requests and provide access to data stored on its BE PDs in the event of a single node failure.

As noted above, implementing an upgrade to a particular service, facility or feature of the data storage system, such as by a software developer, can be complex. The upgrade can also include adding a new feature, service or facility as well as upgrading an existing feature, service or facility. The particular steps that a software developer needs to perform as well as when such particular upgrade work can be implemented during the upgrade process or cycle in a particular release often require a deep understanding of upgrade process, release content, and general system-wide architecture. Thus generally the amount of knowledge typically needed to properly implement a software upgrade can be beyond that of most developers.

Accordingly, described in the following paragraphs are techniques which can be used to perform an upgrade or update in a system. The system can be a data storage system. In at least one embodiment, the data storage system can include one or more dual node appliances forming a cluster or federation. The upgrade or update can be a software upgrade or update and can be performed across the one or more appliances of the system. In at least one embodiment, the upgrade can be characterized as an NDU which is a rolling cluster upgrade where the appliances, and nodes of the appliances, can be upgraded sequentially. In at least one embodiment, the techniques of the present disclosure use defined upgrade integration points which provide a defined structure to guide feature, service, facility and/or data upgrades through the complicated upgrade process.

In at least one embodiment of the techniques of the present disclosure, an upgrade infrastructure with defined integration points can be utilized. The upgrade infrastructure or framework (sometimes simply referred to as infrastructure or framework) guides components of the system through the complicated upgrade process to reduce NDU runtime failures and errors associated with data and feature or service dependencies. The integration points provide organization and structure to the upgrade process. The integration points correspond to defined points in the upgrade process where specific types of work or upgrade processing can be performed during the upgrade workflow process.

In at least one embodiment, main areas of concern during upgrade can relate to data and also the components in the system. One main area of concern can be how one or more data source or containers used by the system and its components are upgraded. Such data sources or containers can include, for example, the data storage system configuration information regarding physical and/or logical entities in a current configuration of the data storage system. A second main area of concern can relate to how a particular component, such as a feature, facility or service, or a node or an appliance of the cluster, behaves while the cluster is being upgraded. For example, in at least one embodiment during the upgrade process as described in the following paragraphs, mixed versions of software can exist across appliances of the cluster. The techniques of the present disclosure can be used to coordinate and orchestrate transitioning appliances of the cluster from running a prior version of software of a particular feature, service or facility to an upgraded version of the software for the particular feature, service or facility.

In at least one embodiment, the integration points can each support either a data upgrade or a software (e.g., executable code) upgrade since these different types of upgrade operations are orchestrated at different phases in the upgrade to manage the complex dependencies between different versions of data and software. In at least one embodiment, a software upgrade can also include installing a new feature, service or facility (e.g., performing an initial installation of the new feature since this is an initial version of the new feature). In at least one embodiment, a data schema upgrade, cluster compatibility, feature enablement and pre-upgrade health checks are examples of directed upgrade work which can be supported through used of the defined integration points.

In at least one embodiment, each integration point defined in connection with an upgrade process or workflow can support a particular type of upgrade work. Such defined integration points makes it clear to a developer implementing an upgrade to a particular service or facility what options are available at a particular phase in the upgrade workflow, and where in the upgrade workflow a particular type of upgrade processing work is supported. In at least one embodiment, the integration points identify where particular types of upgrade work or processing are performed in the upgrade workflow to avoid, for example, runtime failures and to promote, for example, successful integration among multiple services and facilities as well as any upgrade dependencies.

To further illustrate in at least one embodiment, updates to the cluster wide management database can be supported at one or more integration points such as, for example, integration points 3B, 5B and 6 discussed below. However, in at least one embodiment, upgrading a local database that is locally used only by one appliance can only be done in connection with integration point 3A discussed below.

As another example in at least one embodiment, modifying or upgrading the schema or structure of the cluster wide management database can be performed, for example, in connection with integration points 3B and 5B. Data transformation or migration of existing content of the cluster wide management database can be performed, for example, in connection with the integration point 6, which can occur after the schema upgrade of the management database in connection with integration points 3B and 5B. The foregoing can be done to ensure, for example, that any data migration or transformation of the management database associated with integration point 6 takes place after the database schema upgrade to the management database has been completed in prior integration points 3B and 5B, and to ensure that data transformation at integration point 6 is complete before any new or upgraded feature behavior is enabled at a following subsequent integration point such as, for example, integration point 9 discussed below.

In at least one embodiment using the defined integration points of the cluster upgrade workflow, customized upgrade work or processing can be integrated into the workflow in a consistent manner across multiple different features, services or facilities in a single upgrade, and also across multiple different upgrades. In at least one embodiment, the upgrade work or processing can include upgrading an existing feature, facility or service where a developer or user can provide additional code that performs the customized upgrade work at one or more corresponding integration points. In at least one embodiment, the upgrade work or processing can include adding a new feature, facility or service which does not exist in a current version of software running on the one or more appliances of the data storage system.

In at least one embodiment, the upgrade infrastructure code coordinates processing performed for an upgrade workflow. The upgrade infrastructure code can exist independently of other code of features, facilities or services which are upgraded and also independently of other code that performs customized processing to upgrade a feature, facility or service. The upgrade infrastructure code can define particular integration points identifying where other developer-provided code (e.g., also sometimes referred to as user code, user-specified code or user-provided code where the feature or facility developer can be the "user") can be invoked or triggered to perform any needed upgrade work or processing to upgrade a particular feature, facility or service. In this manner, the upgrade infrastructure code can be tested and maintained separately from other user-provided code which is invoked at a particular integration point, where the user-provided code performs customized upgrade work to implement an upgrade to a particular feature, service or facility. Thus, code which performs customized processing to upgrade a particular feature, service or facility can be written by the developer of such a feature or service. The developer, as a user of the upgrade infrastructure, does not need complete or intricate knowledge regarding the upgrade infrastructure code. Rather, the developer can have a more limited working knowledge regarding the particular defined integration points of the infrastructure. The developer of a particular feature, service or facility, as a user of the upgrade infrastructure, can specify what code routines or modules are invoked at the defined integration points, where the code routines or modules perform customized upgrade work or processing to upgrade the particular features, service or facility without modifying the code of the upgrade infrastructure. In at least one embodiment, the upgrade infrastructure code can perform some required general processing to upgrade a feature, service or facility such as, for example, install an updated software version of the feature, service or facility on all the nodes of the appliances and coordinate such installation across the nodes and appliances of the system. The integration points can be characterized as hooks or points which identify upgrade workflow processing points at which a user or developer can perform additional customized upgrade processing work for the particular feature, service or facility being upgraded. Thus in at least one embodiment, the work or processing needed to upgrade a service, facility or feature can be partitioned between the upgrade infrastructure code and other user or developer provided code invoked at the different integration points.

In at least one embodiment, the techniques of the present disclosure can be used to provide an NDU that is a rolling upgrade providing support for: appliance high availability where one node of an appliance can be upgraded at a time; cluster high availability as each appliance is upgraded one appliance at a time; cluster database upgrades (e.g., upgrades to the management database) and local appliance database upgrades; upgrading a client code module within the cluster where the client code module invokes or uses an upgraded version of a feature, facility or service being upgraded (e.g., where a first appliance or first node can include the client code module which performs a call or request to a second appliance or second node including the feature, facility or service being upgraded); an upgrade that can include installing a new feature, service or facility; data upgrades; container or VM placement whereby services can be moved between nodes; and cluster heath checks.

In at least one embodiment providing cluster high availability, all appliances in the system can execute with runtime behavior of the same version of software at any point in time with one or more appliances sometimes operating in a runtime compatibility mode discussed in more detail below. The foregoing can provide for high availability within the cluster so that appliances can communicate with one another whereby one appliance can perform processing, as may be needed, on behalf of another degraded or unavailable appliance. In at least one embodiment, an upgraded feature may not be enabled on any appliance until integration point 9, as discussed below, where processing can be performed to enable the upgraded features across all appliances so that all appliances are enabled atomically. The foregoing provides for consistent inter-appliance communication as well as consistent communication with external data storage system clients, such as a host, in that any internal or external client of the data storage system can communicate with any node or any appliance of the system using the same software version. Thus, in at least one embodiment although an upgraded version of a feature, service or facility can be installed on less than all nodes or less than all appliances of the system, the upgraded version is not yet enabled for use on such nodes or appliances. Rather, in at least one embodiment of the techniques of the present disclosure, the upgraded version can be enabled for use once the upgraded version (e.g., upgraded software or code, as well as upgraded database schema and database content upgrades) has been committed and is successfully installed and ready for use on all nodes and all appliances of the system.

In at least one embodiment, the integration points of the upgrade infrastructure or framework can be characterized as specifying rules of an upgrade policy. The integration points can, for example, embody the policy rules and the scope and types of work or processing that can be performed at different upgrade workflow points associated with the integration points. Put another way, the integration points correspond to upgrade workflow processing points which are supported by the upgrade infrastructure for performing different types of allowable processing or work when implementing an upgrade for a feature, service or facility. For example as discussed below, data transformation or migration can be performed at integration point 6 after all appliances have been upgraded. However, the infrastructure does not support performing data transformation or migration, for example, at prior integration point 4A or 4B, since all appliances have not been upgraded at such prior integration points 4A and 4B.

In at least one embodiment, defined integration points can be used to specify and identify upgrade options and particular types of processing or upgrade work supported at different points in time in the upgrade workflow. The upgrade infrastructure can include code that drives and controls the upgrade workflow process and additionally performs calls to user or developer provided code associated with the different integration points at corresponding points in the upgrade workflow. The integration points can guide feature owners through the upgrade workflow by clearly identifying upgrade options that are supported at different corresponding upgrade workflow processing points. Thus the integration points provide structure for a user or feature developer that uses the upgrade infrastructure. For example, the integration points make it easy for the user or developer to understand what options are available for the types of upgrade work to be performed at different points in the upgrade workflow. A user or feature developer can, for example, provide user-specified code modules or routines that perform customized upgrade tasks. Each user-specified code module or routine can be associated with an integration point, where the integration point is further associated with a corresponding upgrade workflow processing point. The user specified code module which is associated with an integration point can be invoked by code of the upgrade infrastructure at an appropriate workflow processing point in the upgrade, where the workflow processing point is associated with the integration point. In at least one embodiment, the integration points can be further characterized as integration hooks for upgrading data and managing feature behavior during the upgrade. In at least one embodiment, the integration hooks represented by the integration points can denote specific points in the upgrade workflow where customized upgrade work or processing can be performed to implement an upgrade for a particular feature, service or facility. In at least one embodiment, the customized upgrade work or processing can be embodied in a user-provided or a developer-provided code module or routine which is invoked, by the infrastructure code, at an associated workflow processing point during the upgrade workflow process.

The runtime linkage between the user or developer provided code modules or routines and the infrastructure code can be defined and established using any suitable technique such that the user provided code modules or routines are invoked at different workflow processing points which are associated with different integration points. In at least one embodiment, the user or developer provided code module can be invoked at a corresponding upgrade workflow processing point using a callback mechanism which generally associates or links the user specified routine or code module with the corresponding integration point, where the integration point is further associated with a particular upgrade workflow processing point. For example, in at least one embodiment, a defined interface or API (application programming interface) of the infrastructure code can be used to specify the associated linkages between the integration points and corresponding user provided or developer provided code modules, routines or bodies of code which are invoked at particular workflow processing points corresponding to the associated integration points. For example in at least one embodiment, an API can be used to make a call into the infrastructure code where parameters of the API identify the association or runtime linkage between a particular user provided code module or routine and a corresponding integration point. The API call can be made from user or developer code to define and establish the necessary runtime linkages between the upgrade infrastructure code's integration points and other user provided code modules or routines associated with corresponding integration points. The particular syntax and semantics of the API can vary with implementation such as, for example, can vary with the particular coding or programming language used. For example, the API can specify to invoke a user provided code module or routine, "routine1", at integration point 1, where integration point 1 is further associated with workflow processing point 1 in the upgrade workflow controlled by the upgrade infrastructure. In this manner in at least one embodiment, the user provided code, "routine1", can be a callback routine or function where the name, a reference or a pointer to the user provided code, "routine1", can be passed as an argument in the defined API of the upgrade infrastructure, and where the callback routine or function "routine1" is subsequently invoked or called by the upgrade infrastructure code at an appropriate workflow point which is associated with integration point 1 in the upgrade workflow processing. In one embodiment in accordance with the techniques of the present disclosure, the foregoing API can be used to generally register the callback routine or function with a particular integration point of the upgrade infrastructure. More specifically, the foregoing API can be used to register, with the upgrade infrastructure, the association between the callback routine or function and a corresponding integration point at which the callback routine or function is later invoked by the upgrade infrastructure.

In at least one embodiment, each integration point can be associated with one or more callbacks or code entry points to the different user or developer provided code modules, routines or bodies of code. An integration point can be further associated with a corresponding upgrade workflow processing point. At runtime, the upgrade infrastructure code executes and can control or drive the upgrade workflow processing and can also invoke the user or developer provided code modules, routines or bodies of code at different upgrade workflow processing points. For example, a first user provided routine can be associated with a first integration point which is further associated with a first upgrade workflow processing point. The upgrade infrastructure code executes and, at the first upgrade workflow processing point, transfers control to the first user provided routine to execute code of the first user provided routine. Once the first user provided routine has completed execution, runtime control can transfer back to the upgrade infrastructure code to continue with the upgrade workflow processing and additionally invoke any user provided code modules or routines which are associated with corresponding subsequent upgrade workflow processing points.

The foregoing and other aspects of the techniques of the present disclosure are described in more detail in the following paragraphs.

Figure 3:
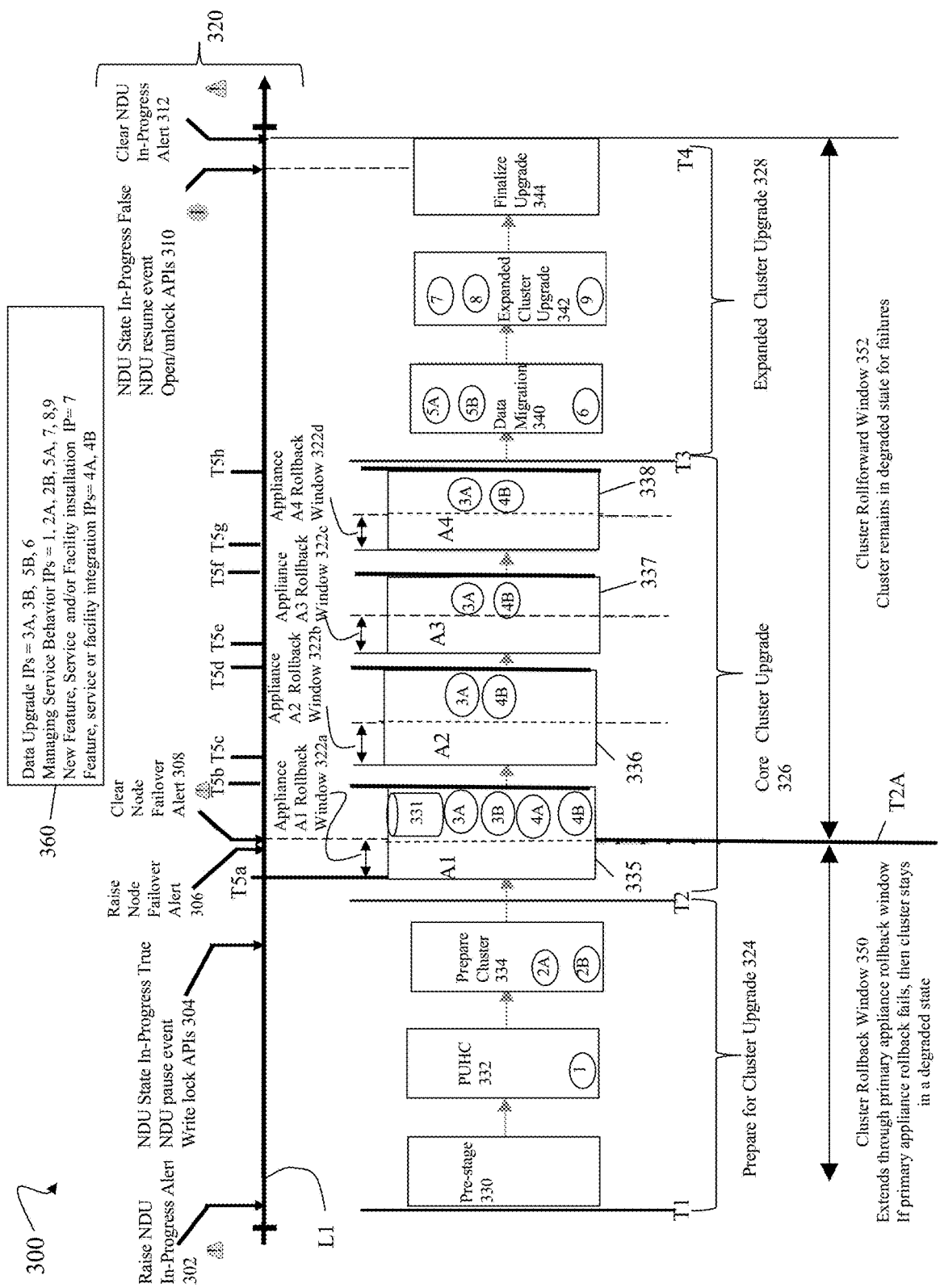

Referring to FIG. 3, shown is an example 300 illustrating components and integration points in at least one embodiment in accordance with the techniques of the present disclosure.

In the example 300, there are 4 dual node appliances A1 335, A2, 336, A3 337 and A4 338 in the data storage system cluster or federation of appliances for illustrative purposes. More generally, the data storage system can include one or more appliances. In at least one embodiment illustrated in the example 300, integration points can be specified, where the integration points discussed below can include the following: 1, 2A, 2B, 3A, 3B, 4A, 4B, 5A, 5B, 6, 7, 8 and 9. Each of the foregoing integration points are denoted in the FIG. 3 illustrating where processing associated with such integration points can be performed in the upgrade processing workflow. In particular, the upgrade infrastructure or framework can include code which performs the illustrated upgrade processing workflow and additionally includes hooks or support at the different defined integration points where other developer or user provided code can be invoked to perform customized upgrade work or processing to implement an upgrade of a particular feature, service or facility.

In at least one embodiment, the upgrade infrastructure can include code that prepares for the cluster upgrade phase 324, performs processing for the core cluster upgrade phase 326, and performs processing of the expanded cluster upgrade phase 328. Code of the upgrade infrastructure can drive or control the upgrade workflow phases 324, 326 and 328 and additionally perform calls to user provided code at the various integration points to perform customized upgrade work or processing in connection with upgrading different features, facilities or services. As illustrated in FIG. 3 in at least one embodiment, the phases 324, 326 and 328 can be performed sequentially in order. In at least one embodiment, the phase 324 can include performing processing denoted by the elements 330, 332 and 334 sequentially. In the phase 324 in at least one embodiment, the processing associated with integration points 1, 2A and 2B can be performed in sequential order. In the phase 326 in at least one embodiment, each of the appliances 335-338 can be upgraded sequentially characterizing a rolling upgrade of the appliances 335-338. When the primary or first appliance 335 is upgraded, the processing associated with the integration points 3A, 3B 4A and 4B can be performed in sequential order. When each of the secondary appliances 336-338 is upgraded, the processing associated with the integration points 3A and 4B can be performed in sequential order. As illustrated in FIG. 3 in at least one embodiment, the phase 328 can include performing processing denoted by the elements 340, 342 and 344 sequentially in order. In the phase 328 in at least one embodiment, the processing associated with integration points 5A, 5B, 6, 7, 8 and 9 can be performed in sequential order.

In at least one embodiment as denoted by the element 360, the integration points 3A, 3B, 5B and 6 can be characterized as generally related to processing performed in connection with the management of data or upgrading the data in the system such as, for example, the cluster-wide management database and its contents, and the appliance-local databases and their contents.

In at least one embodiment as denoted by the element 360, the integration points 1, 2A, 2B, 7, 8 and 9 can be characterized as generally related to processing performed in connection with managing the behavior of features, services and/or facilities on the system.

In at least one embodiment as denoted by the element 360, the integration point 7 can be characterized as generally related to processing performed in connection with installing a new feature, service of facility on the system, where the system does not currently have any version of the new feature, service or facility prior to the installation at the integration point 7.

In at least one embodiment as denoted by the element 360, the integration points 4A and 4B can be characterized as generally related to processing performed in connection with integration of the upgraded features, services and/or facilities with other components.

The foregoing regarding the various integration points, phases and processing performed in connection with the upgrade workflow illustrated in FIG. 3 is described in more detail in the following paragraphs.

The upgrade processing workflow of FIG. 3, and thus code of the upgrade infrastructure, can be invoked in response to a trigger event such as, for example, a user requesting that an upgrade of one or more features, facilities or services be performed. The user, for example, can make the request using a GUI of a data storage management application. For example, the user can make a selection of a user interface element, such as a menu selection, selection of a button, and the like, from the GUI of the management application. In response to the selection, the upgrade processing workflow of FIG. 3 can commence. Thus in at least one embodiment in response to the user selection, the code of the upgrade infrastructure in accordance with the techniques of the present disclosure can be launched and executed to perform processing of the upgrade processing workflow of FIG. 3 which is described in more detail in the following paragraphs.

The element 320 illustrates different alerts and feedback that can be provided to a user in connection with current progress of the upgrade over time. The line L1 denotes the time progression of the upgrade process where the line L1 is annotated with different information or feedback as may be provided at different points in time on a display of a GUI to a user or customer, such as a data storage administrator, of the data storage system.

The time T1 or 302 can denote the point in time when upgrade processing starts and results in display of the alert 302 indicating that the NDU is now in-progress. The point in time denoted by the element 304 indicates the point in time when the NDU is in-progress and the upgrade infrastructure performs processing to write lock, pause, temporarily block or disable use of particular APIs or commands such as those which can be invoked by an external client (e.g., external to the data storage system) using control path or management path requests. For example, a data storage system management application or script executing on a host or other external system can be external to the data storage system and can issue management commands or requests using one or more APIs, such as REST (representational state transfer) APIs, which can modify the data storage system configuration information. The externally issued REST API call can be, for example, a request to provision or configure a new LUN, where servicing or implementing the API requires modifying the existing data storage system configuration information as may be stored in a cluster data base on the data storage system. In this case, the upgrade infrastructure can perform processing which temporarily blocks or disables any externally issued control path REST API, such as from an external client, which writes, updates or performs modifications to a cluster database, such as the management database which includes the data storage system configuration information, which can be affected by the upgrade (e.g., where the data can be modified by the upgrade processing, and/or where the schema or structure of the data can be modified by the upgrade processing). In at least one embodiment, although the write lock is placed on the externally issued APIs at the time 304 where such externally issued APIs can modify data affected by the upgrade, all APIs which only get or read such data can still be allowed and serviced. For example, an externally issued REST API (e.g., from a script or a data storage management application) which reads data storage system configuration information from the management database, such as regarding the currently provisioned LUNs in the system, can still be serviced while other externally issued REST APIs which can write or modify the current data storage system configuration information of the management database are disabled or paused at the time 304.

Additionally in at least one embodiment, the write lock, pause or disabling of particular APIs in the step 304 can also affect what processing can be performed by code which upgrades a particular feature, service or facility. For example, user or developer code which performs processing to upgrade a particular service can be restricted as to when a particular REST API can be invoked, where the particular REST API modifies data storage system configuration information. For example, a first REST API which modifies the data storage system configuration information can be disabled at the point in time 304 and then re-enabled at the point in time 310. In this case, the user or developer code using the first REST API can only execute calls to the first REST API either prior to the time 304, or after the point in time 310.

At the point in time 306, an alert can be raised indicating that a node failover occurred within the appliance A1 335. At the point in time 308, an alert can be raised indicating that the alert for the appliance A1 335 regarding the node failover is cleared. More generally, in each dual node appliance, similar alerts for 306 and 308 can be raised as each node of the appliance is upgraded, fails over to its peer, and then reverts back online whereby the alert for the node is cleared 308.

At the point in time 310, an alert can be raised indicating that the NDU has completed and that the APIs previously paused, disabled, blocked or write locked in the step 304 are now re-enabled.

At the point in time 312, the NDU in-progress alert, which was previously raised at the point 302, can be cleared.

The prepare for cluster upgrade phase 324 can include pre-stage processing 330, PUHC (pre upgrade health check) processing 332 and prepare cluster processing 334. Generally, the phase 324 can include performing processing needed to prepare the cluster for the upgrade for one or more features, services or facilities and ensure that the cluster is in a healthy state in order to successfully perform the cluster upgrade. The pre-stage processing 330 can include, for example, copying the upgrade image or package to the data storage system such as, for example, to a staging area on each of the appliances 335-338. Subsequently, the upgrade image or package can be unbundled or unpackaged and stored in specified locations in the file system on each node. In at least one embodiment, the upgrade image or package can have a predefined format including code and/or data as well as other items, such as one or more scripts, that can be used during the upgrade process. Thus, the element 330 can include, for example, unpacking the multiple pieces of the upgrade image or package and then storing the different unpacked pieces of code, data and other items in particular locations on each node. For example, the particular locations can include particular directories, particular files having particular filenames in specified directories, and the like.

The PUHC processing 332 can be executed before every upgrade to ensure the cluster is sufficiently healthy to support performing an upgrade. In at least one embodiment, integration point 1 can be referred to as the "PUHC integration point" included in the workflow of the PUHC processing 332. The PUHC processing 332 for health or status checks can be run against the current version V1 of different features, services or facilities running in the appliances and also generally with respect to the current state or conditions of the appliances. In at least one embodiment, the PUHC processing 332 can be performed with respect to each of the appliances 335-228 of the system. A user of the infrastructure can specify a user provided code module or routine associated the PUHC integration point 1, for example, to check for a specific condition that must be satisfied before upgrading of a particular feature, facility or service can be performed. In at least one embodiment, the user provided code module or routine associated with integration point 1 can be invoked and executed on each of the appliances. For example with reference to FIG. 3, the user provided code module or routine associated with integration point 1 can be invoked and executed on each of the 4 appliances 335-338. As a variation, the user provided code module or routine associated with integration point 1 can execute on one of the appliances which can communicate with the other appliances to perform the necessary checks and other processing pertaining to each of the appliances 335-338.

In at least one embodiment, the specific condition checked for by the user provided code module or routine associated with integration point 1 can include, for example, checking that each appliance has at least a minimum amount of disk space (e.g., such as on an internal disk of the appliance, and/or on BE PDs used by the appliance) needed to perform the upgrade of the particular feature, facility or service. The specific condition checked for by the user provided code module or routine associated with integration point 1 can include, for example, checking that each appliance has running thereon a second feature, service or facility which can be, for example, used during the upgrade process and/or used by the particular feature, facility or service being upgraded. The specific condition checked for by the user provided code module or routine associated with integration point 1 can include, for example, checking that each appliance has running thereon a particular version of a second different feature, service or facility which can be, for example, used during the upgrade process and/or used by the particular feature, facility or service being upgraded. The specific condition checked for by the user provided code module or routine associated with integration point 1 can include, for example, checking that each appliance has currently running thereon a particular version of the feature, service or facility being upgraded. The specific condition checked for by the user provided code module or routine associated with integration point 1 can include, for example, checking that each appliance has running thereon one or more particular versions of a second feature, service or facility which are compatible for use with the upgraded version V2 of the particular feature, service or facility being upgraded from a current existing version V1.

Generally in at least one embodiment, the user provided code module or routine, which is associated with integration point 1 for a particular feature, service or facility to be upgraded, can perform processing to check for any desired preconditions or dependencies which need to be met in order to proceed with upgrading the particular feature, service or facility. In at least one embodiment, the upgrade processing can fail if any single check of the PUHC fails on any single appliance. More generally in at least one embodiment, processing performed by any user provided code module or routine for any integration point can determine an appropriate execution status based on the particular results and the processing performed by the user provided code module or routine. For example, depending on the particular health check condition checked for in integration point 1, the user provided code module invoked at integration point 1 can determine whether meeting the particular condition should result in an error, a warning, or another execution status. In at least one embodiment, a status of error can result in termination of the upgrade processing whereby the upgrade processing does not proceed until the associated condition no longer results in the error status. As a variation, a status of warning can denote a less severe condition than an error status whereby upgrade processing can be allowed to proceed if a warning status results from execution of the user provided code module or routine.

The prepare cluster processing 334 can include performing any necessary preparatory processing prior to proceeding with an upgrade of a particular feature, service or facility in the system. In at least one embodiment, the integration point 2A can be associated with a workflow processing point of the upgrade workflow in prepare cluster processing 334. The integration point 2A can also be referred to as the "prepare cluster for upgrade" integration point which is associated with an upgrade workflow processing point at which upgrade tasks can be performed to prepare a component, such as a node or appliance, before the core cluster upgrade phase 326 begins. The integration point 2A executes in the context of the current running version of software and/or data on the appliances (e.g., such as V1) prior to performing an upgrade to version (e.g., V2) of software and/or data for one or more features, services or facilities. In at least one embodiment, the user provided code module or routine associated with integration point 2A can be invoked by the infrastructure code and executed with respect to each of the appliances. For example with reference to FIG. 3, the user provided code module or routine associated with integration point 2A can be invoked by the infrastructure code and executed on each of the 4 appliances 335-338, or alternatively execute on one of the appliances which then communicates with the remaining appliances to implement the desired processing, In at least one embodiment, services, features or facilities currently running on the appliance in the phase 324 can optionally continue to run during the upgrade, or alternatively can be paused, disabled or otherwise not run during the upgrade. In at least one embodiment, non-critical features, service or facilities can be paused, disabled or stopped during the upgrade at integration point 2A whereby only those particular features, services or facilities deemed critical continue to run during the upgrade. In at least one embodiment, it can be generally recommended that a feature, facility or service does not run during the upgrade processing in phase 326 unless required or necessary since the upgrade process can be significantly simpler for features, services or facilities that are not running during the subsequent upgrade phase, such as 326. For example, if a service which is upgraded is not running in the phase 326, the service does not have to support complex mixed version dependencies and does not have to support running in a compatibility mode on an appliance as discussed elsewhere herein (e.g., when executing in compatibility mode such as in the core cluster upgrade phase 326, the service may have been upgraded on an appliance from V1 to V2 but continues to run in accordance with the V1 runtime behavior in the phase 326).

The integration point 2A noted above can be used to prepare a feature, service or facility to run during the upgrade, or to alternatively disable, pause or not run/stop the feature, service or facility during the upgrade, such as during the phase 326. Generally, any feature, service or facility that is stopped, disabled or paused at the integration point 2A can be subsequently resumed, restarted, or re-enabled at the integration point 9 (e.g., the Expanded Cluster Upgrade Resume Services integration point) of the phase 328 described below. For example, integration point 2A can be used to manage placement of a particular service on a particular node of an appliance and/or to pause a particular service or facility such as, for example, a particular data protection service or facility running on the appliances 335-338. Thus, a user provided code module or routine can be associated with the integration point 2A for a particular feature, service or facility being upgraded, where the code module or routine can pause, disable or not run the particular feature, service or facility during the upgrade in the phase 326. More generally, the user provided code module or routine associated with the integration point 2A can pause, disable, stop or not run any desired feature, service or facility during the upgrade in the phase 326. Subsequently the feature, service or facility paused or stopped at the integration point 2A can be later restarted or resumed, for example, at the integration point 9 of the phase 328 or at the integration point 4A as discussed below.

The elements 322*a-d* denote appliance rollback windows, respectively, for the appliances A1-A4 335-338 where the particular appliances can rollback to a current version V1, for example, if a failure or error occurs when upgrading from the current version V1 to the version V2 of a feature, facility or service. In at least one embodiment with dual node appliances 335-338, an upgrade of a feature from V1 to V2 on an appliance such as 335 can be rolled back to V1 if there is an error or other event in the rollback window 332*a* causing the upgrade on the appliance 335 to fail. In at least one embodiment as discussed above with a dual node appliance, a first node of the appliance can be upgraded and then the second node of the appliance can be upgraded in sequence. In such an embodiment, the appliance can rollback to the prior version V1 of the feature if the upgrade of the second node to V2 has not yet commenced. In such an embodiment, the appliance level rollback processing can include using content of the second node still running V1 to rollback the first node's V2 upgrade to V1 by restoring the first node to its V1 or pre-upgrade state. For example, the content of the internal disk of the second node can be used to restore content of the internal disk of the first node, as may be needed, from V2 to V1, where such internal disks of the nodes can include code and/or data of the feature whose upgrade failed.

Thus generally the rollback windows 332a-d denote a window of time during which processing is performed to upgrade, respectively, the appliances 335-338 such that if a failure occurs during a particular appliance's rollback window, the particular appliance's upgrade can be rolled back or restored to a pre-upgrade state.

The integration point 2B can also be referred to as "the prepare cluster rollback integration point" which is associated with an upgrade workflow processing point at which upgrade rollback tasks can be performed when the cluster upgrade is rolled back such as, for example, due to an upgrade failure during cluster rollback window 350. The integration point 2B is associated with an upgrade workflow processing point where any needed rollback work can be performed in the event the cluster upgrade is rolled back such as due to an upgrade error or failure within the initial or primary appliance rollback window 322a. For example, in at least one embodiment, a user provided code module can perform rollback work at the integration point 2B, where the user provided code module can be invoked by the infrastructure code in response to rolling back the cluster upgrade such as due to an error or upgrade failure occurring during the rollback window 322a of the appliance 335. The user provided code module associated with integration point 2B can, for example, undo any processing performed previously in connection with another user provided code module associated with integration point 2A. For example, the user provided code module associated with integration point 2B can, for example, restart or resume any feature, service or facility which was disabled, paused or stopped previously on the appliances 335-338 by the other user provided code module associated with integration point 2A. A first routine can be associated with a first service being upgraded where the first routine performs preparatory work for upgrading the first service and wherein the first routine is invoked at integration point 2A. A second routine can be associated with a first service being upgraded where the second routine performs prepare cluster rollback work for the first service and wherein the second routine is invoked at integration point 2B in response to an upgrade error or failure occurring during the primary appliance 335's rollback window 322a. Generally, the second routine can perform processing to restore the appliances 355-338 to their pre-upgrade state and can include undoing processing performed by the first routine.

In at least one embodiment, the user provided code module or routine associated with integration point 2B can be invoked by the upgrade infrastructure when a cluster level rollback occurs such as due to an upgrade failure within the primary appliance's upgrade rollback window 322a. As part of implementing the cluster level rollback, the infrastructure code can call the user provided code module or routine associated with integration point 2B which can include restoration work to restore the appliances 335-338 to their pre-upgrade states. For example, the user provided code module or routine associated with integration point 2B can undo or reverse processing previously performed in connection with integration point 2A such as, for example, restarting, enabling or resuming any feature, service or facility previously stopped, disabled or paused in connection with the integration point 2A. The user provided code module or routine associated with integration point 2B can, for example, move any VMs, containers or applications back to their original pre-upgrade node configuration where such VMs, containers or applications were previously reconfigured for placement on different nodes by another user provide code module or routine executed in connection with integration point 2A.

The element 350 denotes a cluster rollback window which extends through the primary appliance rollback window 322a. If an error or failure occurs in connection with the upgrade workflow processing within the time window 350, a cluster level rollback can be performed. The cluster level rollback can include the infrastructure code invoking the one or more user provided code modules of integration point 2B, where the user provided code modules of integration point 2B are associated with one or more features being upgraded. In at least one embodiment, if the primary appliance rollback fails (e.g., such as when a failure occurs during execution of a user provided code module of integration point 2B), the cluster can remain in a degraded state.

The element 352 denotes a cluster rollforward window. If any error or failure occurs during the upgrade workflow in the window 352, the cluster can remain in a degraded state.

In at least one embodiment, the core cluster upgrade phase 326 can generally include installing and running the upgraded versions of the software and/or data for features, services or facilities being upgraded on the appliances of the cluster.

With reference to the time line L1, the appliance A1 335 can be upgraded in the time window T5a-T5b. The appliance A2 336 can be upgraded in the time window T5c-T5d. The appliance A3 337 can be upgraded in the time window T5e-T5f. The appliance A4 338 can be upgraded in the time window T5g-T5h.

In at least one embodiment in the core cluster upgrade phase 326, the upgrade infrastructure code can perform processing to upgrade each of the appliances 335-338 individually and sequentially in the time order illustrated, and also invoke any user specified or user provided code for the integration points 3A, 3B, 4A and 4B. Within each dual node appliance that is upgraded, the upgrade infrastructure code can perform processing to upgrade each node individually and sequentially and also invoke any user specified or user provided code for the integration points 3A, 3B, 4A and 4B that is applicable to the particular appliance upgraded (e.g., some integration points such as 4A and 3B may only be applicable to the primary appliance 335 as discussed below).

The appliance A1 335 is also sometimes be referred to herein as the primary appliance in that it is the initial or first appliance of the cluster to be upgraded. In particular in the phase 326, a first node of the appliance A1 335 can be upgraded from a current version V1 to a version V2 of a feature, service or appliance. Subsequently, the first node of the appliance A1 335 can be rebooted or restarted with the version V2 running but where the first node performs processing in a compatibility mode to operate in accordance with the prior version V1 (e.g., thus any features or services running operate in accordance with the version V1 compatibility). While the first node of the appliance A1 335 is being upgraded and prior to restarting, the first node fails over to the second node where the second node can perform processing to service all requests of the appliance A1 335. Once the first node of the appliance A1 335 has been upgraded to V2 and restarted, the second node of the appliance A1 335 goes offline, fails over to the first node while the second node is being upgraded from V1 to V2, and then restarts in a manner similar to that as described for the first node of the appliance A1 335. Once the appliance A1 335 has completed upgrading and restarting both of its nodes, the appliance A2 336 can similarly perform a node by node upgrade in the phase 326 in a manner as described for the appliance A1 335. Once the appliance A2 336 has completed upgrading and restarting both of its nodes, the appliance A3 337 can similarly perform a node by node upgrade in the phase 326 in a manner as described for the appliance A1 335. Once the appliance A3 337 has completed upgrading and restarting both of its nodes, the appliance A4 338 can similarly perform a node by node upgrade in the phase 326 in a manner as described for the appliance A1 335. Thus, in at least one embodiment, the appliances 335-338, and nodes thereof, can be upgraded individually in a sequence in the phase 326 as denoted in FIG. 3.

In the time window from T2-T3, the software and data version upgrade from V1 to V2 can be performed in the core cluster upgrade phase 326 in a sequential manner across the appliances 335-338. Thus during the time window T2-T3, the cluster of 4 appliances 335-338 can be characterized as running mixed versions V1 and V2 of the software and data until the upgrade from V1 to V2 is completed for the last or 4th appliance A4 338. In at least one embodiment, even though the appliances of the system can be running mixed versions of the software and data such as in the time window T2-T3, all appliances are operating in accordance with the current or old version V1 so that all appliances operate in accordance with the current or old version V1 even though they may have been upgraded to run V2 software. Those appliances which have been upgraded and are running the V2 software and have a V2 version and schema of data in the time window T2-T3 operate in a compatibility mode to perform processing and use an appropriate version and schema of data compatible with V1. Put another way, although an appliance may have been upgraded to run and use version V2 of software and data, the appliance operates in a runtime or execution compatibility mode in accordance with the V1 software and V1 data. In at least one such embodiment when operating in compatibility mode, any changes to a feature, service or facility in V2 can be disabled in an appliance. Furthermore, when in operating in compatibility mode, although data can be modified in V2 and/or the existing V1 data schema modified in V2, the appliance can operate using the V1 compatible data and the V1 data schema. For example in at least one embodiment, the appliance can retain the V1 data and its schema even though the appliance may also have thereon a V2 data and associated schema so that, when operating in compatibility mode, the appliance can use the V1 data and schema. Subsequently, the upgraded V2 feature using the V2 software and data can be enabled, such as integration point 9 discussed below, once the cluster or complete system upgrade has completed and is committed.

In at least one embodiment in the phase 324, the appliances 335-338 only have existing V1 software and data installed thereon and thus perform processing and execute in accordance with the existing V1.

In at least one embodiment in the phase 326, the cluster can have mixed versions V1 and V2 installed and running on the appliances 335-338, depending on the current point in time of the upgrade. During the phase 326, appliances of the cluster all operate (e.g., perform runtime processing and execute) in accordance with the existing V1. If a node or appliance has V2 installed and running thereon, that node or appliance can operate in a V1 runtime compatibility mode (sometimes referred to simply as compatibility mode) as discussed elsewhere herein. Thus in the phase 326, the upgraded V2 features can be characterized as disabled. As discussed in the following paragraphs, such upgraded V2 features can be subsequently enabled at integration point 9 of the phase 328.

In at least one embodiment in the phase 328, the upgraded version V2 of the software is installed and running on all the nodes of all the appliances where any final modifications to the data (e.g., database schemas and data transformations) are made in the phase 328 at the integration points 5B and 6 prior to the integration point 9.

In at least one embodiment, the cluster appliance upgrade can be characterized as committed once the processing associated with the integration point 6 has completed whereby the upgraded V2 features can be enabled in the integration point 9. Thus, subsequent to integration point 9 of the phase 328, all appliances no longer perform processing in the V1 runtime compatibility mode. Rather, the V1 runtime compatibility mode can be disabled and the appliances now operate and perform processing based on the upgraded V2 code and data. In at least one embodiment as illustrated in FIG. 3 after completion of processing associated with integration point 6, the new V2 software has been installed on all the appliances 335-338 of the cluster and data associated upgrade V2 work has also been completed on all the appliances 335-338. In such an embodiment after integration point 6, additional cluster upgrade work can be completed by the upgrade infrastructure or framework and also by user code routines or modules associated with integration points 7, 8 and 9 before the cluster upgrade work can be characterized as committed. In such an embodiment, the entire cluster upgrade can be characterized as committed after completion of associated processing for integration point 9 when all the upgrade work for the entire cluster has been completed.

As can be seen in FIG. 3, the integration points 3A, 3B, 4A and 4B are included in the core cluster upgrade phase 326. In at least one embodiment, the integration points 3A, 3B, 4A and 4B can be associated with upgrade workflow processing for an appliance occurring after the appliance has been upgraded with the V2 software and data. In other words, the user provided code modules or routines associated with the integration points 3A, 3B, 4A and 3B are invoked and execute on an appliance after the appliance has been upgraded with the V2 code and data for the one or more features, services or facilities. In at least one embodiment, code modules or routines associated with the integration points 3A, 3B, 4A and 4B can be executed on the primary appliance 335, and code modules or routines associated with the integration points 3A and 4B can be executed on the secondary appliances 336-338 (e.g., integration points 3B and 4A may not be associated with processing performed on the secondary appliances 336-338).

In at least one embodiment, the data storage system including the 4 appliances 335-338 can have one or more cluster-wide databases which include information used by all appliances of the data storage system. In such an embodiment, the management database 331 can be a system-wide or cluster-wide database which includes the data storage system configuration information discussed elsewhere herein, where the data storage system configuration information describes the current configuration of the data storage system. For example, the management database 331 can include information regarding the physical and logical entities in the data storage system, and can include configuration information identifying the particular appliances in the cluster. In at least one embodiment, the element 331 can denote the primary copy of the management database 331 stored on the primary appliance 335. Each of the remaining appliances 336-338 can include a local copy (not illustrated) of the management database 331 used for processing by the particular appliance. An embodiment can use any suitable mechanism to synchronize the management database 331 and local copies thereof on the appliances 335-338. Generally the management database 331 can be characterized as system-wide or cluster-wide in that it includes information relevant to the entire system or cluster.

Each of the appliances 335-338 can also include appliance level local databases (sometimes referred to simply as local databases) which can include information generally only applicable to the particular local appliance. In at least one embodiment, each appliance 335-338 can persistently store information in an appliance level local database which includes, for example, performance and workload statistics for the different LUNs configured on the BE PDs local to the appliance, and appliance level state and configuration information. The appliance level state information can describe, for example, the current progress of the upgrade with respect to the particular appliance, where the appliance level state information can also be duplicated or shadowed in the management database so that the management database 331 can describe a cluster view of the upgrade state.

The integration point 3A can be referred to as the "local database schema upgrade" integration point. The integration point 3A can be used to perform work to update the schema or structure of a local database of an appliance. The schema or structure update to the local database can include, for example, adding or removing a table from the local database, adding or removing a column from an existing table in the local database, and the like. In at least one embodiment, a user provided code module can update or modify the local database schema of local databases of the appliances 335-558 at the integration point 3A, where the user provided code module of integration point 3A can be invoked by the infrastructure code as described in more detail elsewhere herein.

The integration point 3B can be referred to as the "management database schema upgrade" integration point. The integration point 3B can be used to perform work to update the schema or structure of the management database 331, or more generally the cluster-wide or system-wide database with its primary copy stored on the primary appliance 335. Thus, in at least one embodiment, the integration point 3B can be applicable only to the primary appliance 335. In at least one embodiment, a user provided code module can update or modify the schema or structure of the management database 311 at the integration point 3B, where the user provided code module of integration point 3B can be invoked by the infrastructure code as described in more detail elsewhere herein.

With respect to the primary appliance 335, the integration points 3A and 3B can be associated with upgrade workflow processing points after the control path is restarted on the primary appliance using the upgraded version V2 of the upgraded software running on the primary appliance 335. In at least one embodiment, the control path can be used to perform the schema changes to the management database 331 (e.g., integration point 3B) and the primary appliance's local database (e.g., integration point 3A). Thus, a first user provided code module or routine associated with integration point 3A and second user provided code module or routine associated with integration point 3B can be invoked by the infrastructure code and executed on, or with respect to, the primary appliance 335 to perform schema or structure changes to the local database and the management database of the primary appliance 335.

With respect to each of the remaining secondary appliances 336-338, the integration point 3A can be associated with an upgrade workflow processing point after the control path is restarted on each secondary appliance using the upgraded version V2 of the upgraded software running on the secondary appliance. In at least one embodiment, the control path can be used to perform the schema changes needed each appliance's local database. Thus, a first user provided code module or routine associated with integration point 3A can be invoked by the infrastructure code and executed on, or with respect to, each of the secondary appliances 336-338 to perform schema or structure changes to the local database of each such appliance.

The integration point 4A can also be referred to as the "primary appliance upgrade resume services" integration point. The integration point 4A can be used if a particular feature, service or facility is required to run on the cluster during the upgrade. As noted above in at least one embodiment, it can be recommended that only critical features, services or facilities run during the upgrade. In the event a feature, service or facility does run during the upgrade workflow processing, then the feature, service or facility operates or executes in accordance with the compatibility mode for the mixed version cluster. In at least one embodiment, upgrade workflow processing performed at the integration point 4A can include, for example, restarting, resuming or enabling a service that runs on the primary appliance 335, where the service can be a cluster service controller or orchestrator software component that schedules work on all appliances 335-338 of the cluster. Thus in such an embodiment, starting a service in connection with integration point 4A starts the service for use with all the appliances 335-338, or more generally, the entire cluster. For example, a replication service can be restarted by a user code module or routine at integration point 4A on the primary appliance 335 where the replication service can also schedule other work or processing, as may be needed, that is performed on the remaining secondary appliances 336-338.

The integration point 4A can be associated with upgrade workflow processing performed on only the primary appliance 335 after the primary appliance 335 has been successfully upgraded with the V2 software and after the database schema of the management database 331 stored on the primary appliance 335 has been upgraded in connection with V2 database schema changes associated with integration point 3B. The integration point 4A can be associated with a user provided code module or routine, for example, that resumes or restarts an upgraded service on the primary appliance 335 after the service software on the appliance 335 has been successfully upgraded from V1 to V2 and after the database schema of the management database 331 has been upgraded from V1 to V2 schema changes associated with the integration point 3B. In at least one embodiment, any work or processing performed by the user provided routine associated with the integration point 4A can be local to the appliance 335 and cannot, for example, use any cluster-wide commands or operations since the cluster appliances can be running mixed versions V1 and V2 of code of features being upgraded. The infrastructure code can invoke the user provided routine associated with integration point 4A after the primary appliance has been successfully upgraded to use the V2 software and after the V2 database schema upgrade of the management database 331 associated with the integration point 3B has been completed. For example, assume a service has been upgraded from V1 to V2 and the service is required to run during the upgrade process. In this case, the user provided routine associated with integration point 4A can start or run the upgraded V2 service in the compatibility mode so that the upgraded service performs processing at runtime in accordance with the prior version V1 of the service (e.g., as prior to the upgrade) and also the prior version V1 of the database schema of the management database. In at least one embodiment, the user provided routine associated with integration point 4A can only be executed on the primary appliance 335.

The integration point 4B can be associated with upgrade workflow processing performed on each of the appliances 335-338 after the appliance has been successfully upgraded. Generally, the integration point 4B can be associated with customized upgrade work which integrates the upgraded feature, service or facility with other components on the appliance (e.g., after the feature, service or facility has been upgraded on the appliance). The integration point 4B can be associated with a user provided code module or routine, for example, that resumes or restarts an upgraded service on one of the appliances such as 336 after the service software on the appliance 336 has been successfully upgraded such as from a prior version V1 to version V2. Consistent with discussion elsewhere herein, in this case, the upgraded service can be restarted to operate and run in a compatibility mode in accordance with the prior version V1 (e.g., software and data). Any work or processing performed by the user provided routine associated with the integration point 4B can be local to the particular appliance upon which the routine is executed. For example, the work or processing performed by the user provided routine associated with the integration point 4B can include establishing communications between different containers or VMs within the same appliance so that such containers or VMs can communicate with one another. The work or processing performed by the user provided routine associated with the integration point 4B cannot, for example, use any cluster-wide commands or operations since the cluster appliances can be running mixed versions V1 and V2 of code of features being upgraded. For each of the appliances 335-338, the infrastructure code can invoke the user provided routine associated with integration point 4B and execute the routine on each such appliance after the appliance has been successfully upgraded.

The expanded cluster upgrade phase 328 can include data migration processing 340, expanded cluster upgrade processing 342 and finalize upgrade processing. Generally in at least one embodiment, the data migration processing 340 can include providing further schema database updates such as to the management database and/or appliance local databases, and can include performing processing to transform, migrate or convert existing content of the management database and/or appliance local databases to use upgraded schemas. In at least one embodiment, the data migration processing 340 can include integration points 5A, 5B and 6 described in more detail below.

In at least one embodiment, the expanded cluster upgrade processing 342 can include installing new components; reconfiguring placement of the control path on a particular node of each appliance; restarting, resuming or enabling features, services or facilities that were previously stopped, paused or disabled in connection with prior integration points; and enabling the upgraded V2 features and the newly installed components. In at least one embodiment, the expanded cluster upgrade processing 342 can include the integration points 7, 8, and 9 described in more detail below.

In at least one embodiment, the finalize upgrade processing 344 can generally include any additional processing needed to finalize the upgrade. The element 344 can include, for example, performing cleanup processing for the upgrade such as deleting temporary files, releasing allocated memory used for holding in-memory temporary structures or information used in performing the upgrade, and the like.

The integration point 5A can be associated with processing performed to pause services prior to further management database schema updates (e.g., performed in connection with integration point 5B discussed below) and prior to performing migration or transformation of the existing content of the management database to use the upgraded V2 management database schema (e.g., performed in connection with integration point 6 discussed below).

The processing associated with integration point 5A can stop or pause a first service, for example, which may otherwise access and modify the management database while the management database is being upgraded in connection with processing of subsequent integrations points 5B and 6. If, for example, the first service continues running rather than being stopped or paused at integration point 5A, problems or issues (e.g., deadlock, data corruption, data inconsistencies, extended timeouts while attempting to perform an operation or task) can arise as a result of the first service accessing and/or modifying the management database at the same time other processing of integration points 5B and 6 is also trying the access and/or modify the management database.

A service that is paused or stopped in connection with integration point 5A can be restarted or resumed at the subsequent integration point 8. At the integration point 8, the service can be restarted when the appliances are running the upgraded V2 software and after the subsequent schema changes and data migration or transformation associated, respectively, with the integration points 5B and 6 have been completed. In at least one embodiment, a user provided code module or routine associated with integration point 5A and be invoked by the infrastructure code to pause, stop or disable one or more features, services or facilies.

For example, in at least one embodiment an upgrade can be performed to upgrade supported protocols by adding support for a storage access and transport protocol, such as NVMe (Non-volatile Memory Express), for SSDs. In connection with this upgrade, the management database schema can be modified at integration point 5B to add NVMe support such as add one or more new LUN attributes used with NVMe, and existing content of the management database can be migrated or transformed at integration point 6 to adapt to the existing data of the management database to the updated management database schema. In this case, a data replication service can be paused or stopped in connection with integration point 5A when the upgrade includes adding NVMe support as just described to avoid potential undesirable adverse consequences such as deadlock, data corruption or inconsistencies, extended operation timeouts, and the like. Such adverse consequences can result, for example, if the data replication service attempts to access and/or modify the same database structures (e.g., tables such as a volume table) and content which are also modified in connection with IP5B and IP6 to add NVME support.

The integration point 5B can be associated with processing performed to further modify the management database schema. In one aspect, the integration point 5B can be characterized as associated with a second chance to upgrade the management database schema after all appliances have been upgraded in the phase 326 to run the version V2 of the upgrade software. The integration point 3B can be associated with processing of a prior first chance to upgrade the management database schema. The integration 5B can be characterized as similar to the integration point 3B with the difference that the integration point 5B is done after all appliances have been upgraded to run the version V2 of the upgraded software. In at least one embodiment, there may be cases where upgrading the management database schema cannot be done at the integration point 3B, for example, due to the state of the upgrade processing at the integration point 3B. To further illustrate, for example, it may be that performing schema updates to the management database to add new LUN attributes for the NVMe support requires that all the appliances 335-338 run the upgraded V2 software which does not occur until the phase 328 (e.g., even though such V2 feature may not yet be enabled until the subsequent integration point 9). In this case, the necessary schema updates to the management database for the LUN attributes cannot be implemented in connection with the integration point 3B.

The integration point 6 can be referred to as the "data migration or data transformation" integration point. The integration point 6 can be associated with processing performed to migrate or transform the existing content of the management database to conform to the upgraded V2 management database schema. In at least one embodiment, the integration point 6 can be associated with processing performed to migrate or transform the existing content of the local databases of the appliances to conform to the upgraded V2 local database schema. The integration point 6 can be associated with a user provided code module or routine invoked by the infrastructure code, where the user provided code module or routines performed processing including, for example, transforming or converting existing data stored in the management database by reformatting such existing data in accordance with the upgraded V2 management database schema. For example, consider the case where the upgraded management database schema includes a new LUN attribute added to an existing LUN or volume table, where the volume table includes a record for each configured or provisioned LUN in the data storage system. The processing performed by the user provided module or routine associated with integration point 6 can include providing a default or new value for the new LUN attribute for all LUN records stored in the volume table. For example, consider adding the new LUN attribute in connection with NVMe support where the new LUN attribute is an identifier, such as an NGUID (Namespace Globally Unique Identifier), used in connection with the NVMe standard to identify each LUN. In this case, integration point 6 processing can include generating unique new NGUID values for all existing LUNs each having a corresponding record in the volume table of the management database.

In at least one embodiment, integration point 6 is associated with an upgrade workflow processing point where all the appliances are running the upgraded V2 software and after database schema upgrades for V2 are applied to the management database schema (e.g., reflecting schema updates associated with prior integration points 3B and 5B). It should be noted that although the appliances 335-338 are running the V2 software and the database schema upgrades for V2 are applied to the management database schema (e.g., reflecting schema updates associated with prior integration points 3B and 5B) at integration point 6, such appliances 335-338 are still operating in accordance with the V1 compatibility mode using the V1 runtime behavior and the V1 data compatibility (e.g., using the V1 database schema).

In at least one embodiment, the user provided code modules or routines associated with the integration point 5A can be executed on all the appliances, the user provided code modules or routines associated with the integration points 5B and 6 which modify the management database can be executed on the primary appliance 335; and the user provided code modules or routines associated with the integration points 5B and 6 which modify the local databases can be executed on each of the appliances 335-338.

The integration point 7 can be associated with processing performed to install a new component, such as a new feature, service or facility. It should be noted that the component installed at the integration point 7 can be characterized as new in that the new component did not exist in the prior version V1 on the system prior to the upgrade. Put another way, for the new component being installed, this is the initial installation of the new component on the system. Further installing the new component may not be considered a modification or an upgrade to an existing V1 component such as an existing V1 feature, service or facility.

In at least one embodiment, the new component may further require that all appliances of the system already have been upgraded to the V2 software and data where the upgraded V2 software and data have been enabled (e.g., perform runtime processing in accordance with V2 runtime behavior and data schema). As an example, a new component can be installed in connection with integration point 7 which performs data replication to the cloud, where data is replicated from the data storage system to external cloud-based storage or simply "the cloud". Cloud storage is a cloud computing model that stores data on the Internet through a cloud computing provider which manages and operates data storage as a service. Cloud-based data storage can be delivered on demand with just-in-time capacity and costs, and eliminates buying and managing your own data storage infrastructure. With cloud storage, data is stored in logical pools, said to be on "the cloud". The physical storage of the logical pools of cloud-based storage can span multiple data storage systems and multiple data centers typically owned and managed by a storage provider or hosting company.

In at least one embodiment, processing performed by a user provided code module or routine invoked at integration point 7 can, for example, perform customized processing to install the new component on the appliances of the cluster. As noted above in at least one embodiment, the initial or first time installation of the new feature, facility or service can have a requirement to be installed appliances currently running the upgraded version V2 software and data, where such V2 features are currently enabled on the appliances providing V2 runtime compatibility. In other words in at least one embodiment, the new service may have an installation requirement in that the new service can only be installed on a data storage system currently running the upgraded version V2 of software (e.g., even though such V2 features have not yet been enabled).

To further illustrate, consider the following example. In order to support replication to the cloud in at least one embodiment, the data storage system itself may have to first be upgraded to use V2 software. The V2 software can, for example, support a new set of internally used APIs which are not supported in the prior V1 version of software and data. The new internally used APIs can be enabled for use with the new replication to the cloud service within the V2 software while still operating in accordance with the V1 compatibility mode (e.g., where the system operates in accordance with the V1 runtime behavior and V1 data schema). The new feature or service of replication to the cloud may use the new set of APIs included in the upgraded V2 software and thus require that the V2 software be installed on the appliances 335-338 prior to installation of the new replication to the cloud service. Depending on the embodiment, the new internally used APIs (e.g., such as used internally within the data storage system or cluster) can be enabled for use at integration point 7 as opposed, for example, to other new V2 APIs that can be used or exposed externally for use outside of the cluster. In this case, the internally used APIs can be contrasted with the other new V2 APIs which can be characterized as external and may not be enabled at integration point 7.

In at least one embodiment, such new components are added at integration point 7 after completion of integration point 6 processing whereby all appliances have been upgraded to use the upgraded V2 software and V2 database schema. In this manner, the new components can be installed on a stable upgraded cluster running the V2 software and V2 database schema. (e.g., V2 upgrades applied in connection with integration points prior to integration point 7). In at least one embodiment, if a new component installed at integration point 7 requires utilization of a new V2 API, or more generally other V2 functionally, not yet enabled at integration point 7 but rather where the new V2 API (or other V2 functionality) is enabled at integration point 9, a first user provided routine or code module invoked at integration point 9 can invoke or call back to a second user provided routine or code module associated with integration point 7 to configure or enable the new component after the new V2 API (upon which the new component depends) is itself enabled.

In at least one embodiment, the new component (e.g., new feature, service or facility) can be installed at the integration point 7 across the nodes of the multiple appliances 335-338 of the system in rolling sequential manner as discussed above in connection with performing an upgrade to a feature, service or facility in the phase 326.

In at least one embodiment, the newly installed components in connection with integration point 7 may not yet be enabled until the subsequent integration point 9 discussed below.

In at least one embodiment, each appliance can run an instance of the control path on one of the nodes of the appliance. In such an embodiment, one of the control path instances running on the appliances can be designated as the primary control path instance which receives incoming control path or management requests and communicates with external management clients, for example, such as the data storage system management application. The primary control path instance can be a driver or main control path instance which distributes control path or management requests to other control path instances on other appliances. For example, the primary control path instance can run on the primary appliance 335 where the primary control path can communicate with 3 control path instances respectively on the appliances 336-338.

In at least one embodiment, there can be a default node upon which the control path instance executes on each appliance. For example, each appliance can include 2 nodes designated as node A and node B. A default or static assignment can be made so that the control path instance of each appliance 335-338 runs on node A of the appliance.

The integration point 8 can be referred to as the "post cluster upgrade control path node preference" integration point. The integration point 8 can be used to dynamically manage and configure placement of the control path instance on each of the individual appliances 335-338.

The work or processing performed by a user provided routine associated with the integration point 8 can place or locate the control path instance of each appliance on a particular node of the appliance. For example, the user provided routine associated with the integration point 8 can locate and run a control path instance on node A of each of the appliances 335 and 337, and locate and run a control path instance on node B or each of the appliances 336 and 338. For each of the appliances 335-338 in at least one embodiment, the infrastructure code can invoke the user provided routine associated with integration point 8 and execute the routine on each such appliance. As an alternative in at least one embodiment, the user provided routine associated with integration point 8 can execute the routine, for example, on one of the appliances and then communicate with the other appliances to control placement of the control path instances across appliances of the cluster.

The integration point 9 can be referred to as the "expanded cluster upgrade resume services and enable new features" integration point. The integration point 9 corresponds to an upgrade workflow processing point where a feature, service or facility can be restarted. For example, a first service may have been previously stopped, paused or disabled in connection with the prior integration point 2A or 5A. The first service can now be restarted or enabled at the integration point 9 by processing performed by a user provided routine associated with the integration point 9. Additionally, the integration point 9 corresponds to an upgrade workflow processing point where the new or upgraded features, services or facilities can be enabled. Consistent with other discussion herein, during the upgrade prior to the integration point 9 (e.g., such as in the phase 326), the cluster runs in a V1 compatibility mode where new or upgraded V2 features are not enabled. The new or upgraded V2 features, services or facilities can now be enabled at integration point 9 by processing performed by a user provided routine associated with the integration point 9. In at least one embodiment, the infrastructure code can invoke the user provided routine associated with integration point 9 and execute the routine on each of the appliances 335-338. As an alternative in at least one embodiment, the user provided routine associated with integration point 9 can execute the routine, for example, on one of the appliances and then communicate with the other appliances to enable the new or upgraded features, services or facilities across all appliances of the cluster.

In at least one embodiment, once a new or upgraded feature, service or facility is enabled in connection with integration point 9, the appliances no longer run in V1 compatibility mode and rather execute and perform processing in accordance with the upgraded V2 version runtime behavior. If the upgrade includes modifications to the database schema, the upgraded or modified version V2 of the database schema can be used. Additionally in at least one embodiment, the new components installed at integration point 7 can also be enabled at the integration point 9.

Figure 4:
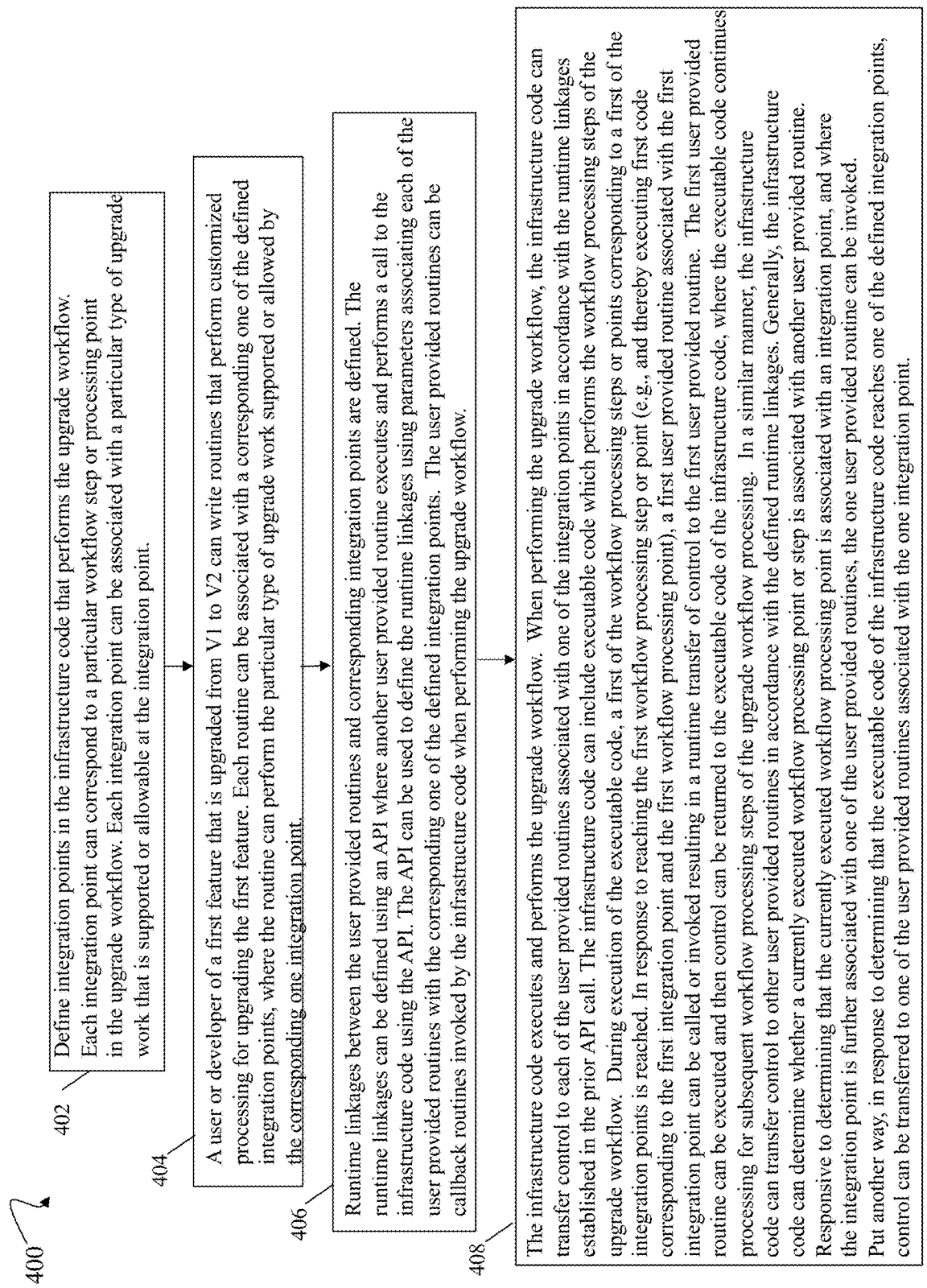
FIG. 4 is a flowchart of processing steps that can be performed in an embodiment in accordance with the techniques of the present disclosure.

Referring to FIG. 4, shown is a flowchart 400 of processing steps that can be performed in an embodiment in accordance with the techniques of the present disclosure. The flowchart 400 summarized processing described above.

At the step 402, integration points can be defined in the infrastructure code that performs the upgrade workflow. Each integration point can correspond to a particular workflow step or point in the upgrade workflow. Each integration point can be associated with a particular type of upgrade work that is supported or allowable at the integration point. From the step 402, control proceeds to the step 404.

At the step 404, a user or developer of a first feature that is upgraded from V1 to V2 can write routines that perform customized processing for upgrading the first feature. Each routine can be associated with a corresponding one of the defined integration points, where the routine can perform the particular type of upgrade work supported or allowed by the corresponding one integration point. From the step 404, control proceeds to the step 406.

At the step 406, runtime linkages between the user provided routines and corresponding integration points are defined and established or instantiated. The runtime linkages can be defined using an API where another user provided routine executes and performs a call to the infrastructure code using the API to establish or instantiate the runtime linkages. The API can be used to define the runtime linkages using parameters associating each of the user provided routines with the corresponding one of the defined integration points. The user provided routines can be callback routines invoked by the infrastructure code when performing the upgrade workflow. From the step 406, control proceeds to the step 408.

At the step 408, the infrastructure code executes and performs the upgrade workflow. When performing the upgrade workflow, the infrastructure code can transfer control to each of the user provided routines associated with one of the integration points in accordance with the runtime linkages established in the prior API call. The infrastructure code can include executable code which performs the workflow processing steps of the upgrade workflow. During execution of the executable code, a first of the workflow processing points or steps corresponding to a first of the integration points is reached. In response to reaching the first workflow processing point or step (e.g., and thereby executing first code corresponding to the first integration point and the first workflow processing point), a first user provided routine associated with the first integration point can be called or invoked resulting in a runtime transfer of control to the first user provided routine. The first user provided routine can be executed and then control can be returned to the executable code of the infrastructure code, where the executable code continues processing for subsequent workflow processing steps of the upgrade workflow processing. In a similar manner, the infrastructure code can transfer control to other user provided routines in accordance with the defined runtime linkages. Generally, the infrastructure code can determine whether a currently executed workflow processing point is associated with another user provided routine. Responsive to determining that the currently executed workflow processing point is associated with an integration point, and where the integration point is further associated with one of the user provided routines, the one user provided routine can be invoked. Put another way, in response to determining that the executable code of the infrastructure code reaches one of the defined integration points, control can be transferred to one of the user provided routines associated with the one integration point.

Figure 5:
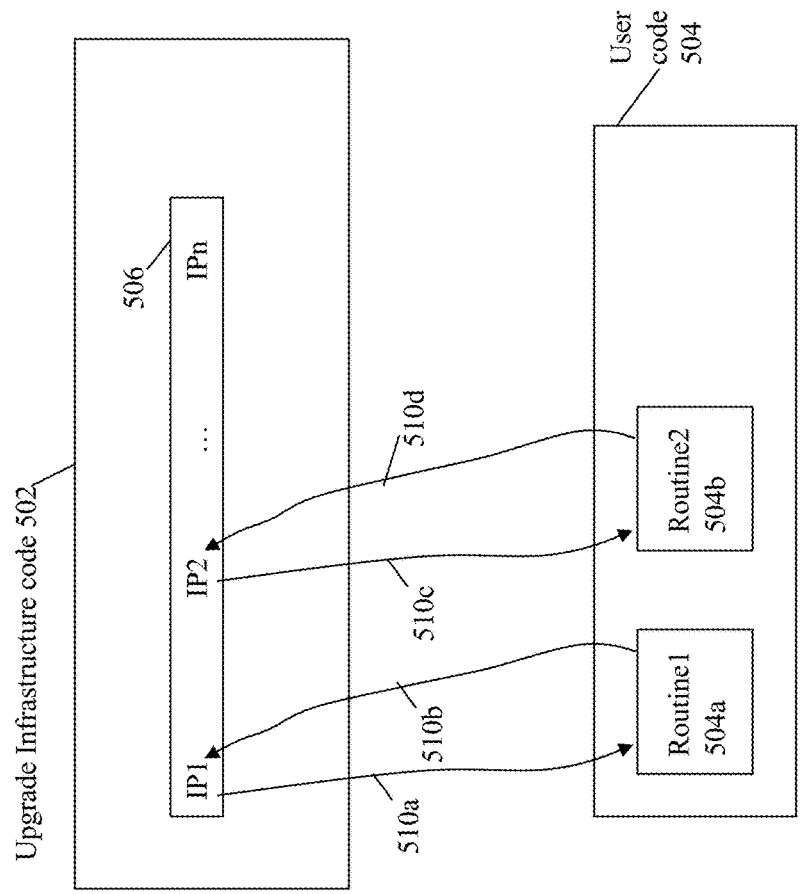
FIG. 5 is an example illustrating use of callbacks from upgrade infrastructure code to user provided routines in an embodiment in accordance with the techniques of the present disclosure.

Referring to FIG. 5, shown is an example 500 illustrating use of callbacks to user provided routines in an embodiment in accordance with the techniques of the present disclosure.

The example 500 includes the upgrade infrastructure code 502, defined integration points (IPs) 506, and user code 504. The user code 504 includes routine 1 504a and routine 2 504b. An established runtime linkage can exist between integration point (IP)1 and the routine 1 504a. Another established runtime linkage can exist between IP2 and the routine 504b. The upgrade performance infrastructure code 502 can be executed to perform the workflow processing steps of the upgrade workflow such as described and illustrated in connection with FIG. 3. At runtime while executing the upgrade infrastructure code 502, a first workflow processing step or point of the upgrade workflow corresponding to the IP1 can be reached. In response to reaching the first workflow processing point or step corresponding to the IP1 during the executing of the code 502, runtime control can be transferred 510a from the IP1 to the routine 504a in accordance with the established runtime linkage between IP1 and 504a. Once the routine 504a has completed execution, control can be returned 510b to the code 502. The code 502 can continue execution with other workflow processing steps of the upgrade workflow. Subsequently, at runtime while executing the upgrade infrastructure code 502, a second workflow processing step or point of the upgrade workflow corresponding to the IP2 can be reached. In response to reaching the second workflow processing point or step corresponding to the IP2 during the executing of the code 502, runtime control can be transferred 510c from the IP2 to the routine 504b in accordance with the established runtime linkage between IP2 and 504b. Once the routine 504b has completed execution, control can be returned 510d to the code 502. The code 502 can continue execution with other workflow processing steps of the upgrade workflow.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:
1. A computer-implemented method comprising:
defining a plurality of integration points, wherein each of the plurality of integration points is associated with one of a first plurality of workflow processing points included in an upgrade workflow;
associating each of a plurality of code entities with a corresponding one of the plurality of integration points; and
performing first processing that performs the upgrade workflow to upgrade a system including a plurality of appliances, wherein the upgrade includes upgrading a first feature, facility or service of the system from a current version to a new version, wherein the first processing further includes:
executing first executable code corresponding to the first plurality of workflow processing points, wherein a first workflow processing point of the first plurality is associated with a first integration point of the plurality of integration points; and in response to said executing reaching the first workflow processing point corresponding to the first integration point, invoking a first of the plurality of code entities associated with the first integration point, wherein said first code entity performs first customized processing in connection with upgrading the first feature, facility or service in the system, wherein the first feature, service or facility runs during the upgrading of the first feature, service or facility, wherein the plurality of integration points includes a sixth integration point that corresponds to a point in the upgrade workflow after software of the first feature, service or facility on a primary appliance of the plurality of appliances has been upgraded from the current version to the new version, wherein the sixth integration point corresponds to a point in the upgrade workflow where the first feature, service or facility is started and executes in a compatibility mode in accordance with a runtime behavior of the current version of the first feature, service or facility, wherein a sixth of the plurality of code entities performs processing that includes starting or running the first feature, service or facility in the compatibility mode of the current version, and wherein the sixth code entity is invoked in said first processing by the first executable code of the upgrade infrastructure in response to the first executable code of the upgrade infrastructure reaching said sixth integration point during the first processing.

2. The method of claim 1, wherein the first plurality of workflow processing points corresponds to a plurality of first entry points in the first executable code of an upgrade infrastructure, and wherein the upgrade infrastructure performs the first processing to implement the upgrade workflow.

3. The method of claim 2, wherein said associating specifies execution or runtime linkages between the plurality of code entities and the plurality of integration points, and wherein the plurality of code entities are user-provided code entities not included in the upgrade infrastructure.

4. The method of claim 3, wherein each of said plurality of code entities, which corresponds to one of the plurality of integration points associated with one of the plurality of integration points, is a callback routine or code module invoked in said first processing by the first executable code of the upgrade infrastructure in response to the first executable code of the upgrade infrastructure reaching said one integration point during the first processing.

5. The method of claim 4, wherein the first integration point corresponds to a point in the upgrade workflow where a pre-upgrade health check of the system is performed, wherein the pre-upgrade health check includes a first condition that must be met in order for the upgrade workflow to continue, and wherein the first code entity performs processing that determines whether the first condition is met in order to continue with the upgrade workflow.

6. The method of claim 5, wherein the plurality of integration points includes a second integration point in the upgrade workflow occurring after the first integration point in the upgrade workflow, wherein at the second integration point a preparatory task is performed prior to upgrading the first feature, service or facility on the system, wherein the preparatory task includes disabling, pausing or stopping another feature, service or facility that is not required to run during the upgrading of the first feature, service or facility of the system, and wherein the preparatory task is performed by a second of the plurality of code entities invoked in said first processing by the first executable code of the upgrade infrastructure in response to the first executable code of the upgrade infrastructure reaching said second integration point during the first processing.

7. The method of claim 6, wherein the plurality of integration points includes a third integration point in the upgrade workflow occurring after the second integration point in the upgrade workflow, wherein at the third integration point rollback processing is performed in response to an occurrence of a system-wide rollback of the upgrade, and wherein the rollback processing is performed by a third of the plurality of code entities invoked in said first processing by the first executable code of the upgrade infrastructure in response to the first executable code of the upgrade infrastructure reaching said third integration point during the first processing.

8. The method of claim 7, wherein the system includes a plurality of appliances each including a plurality of processing nodes.

9. The method of claim 8, wherein the plurality of integration points includes a fourth integration point occurring after the third integration point in the upgrade workflow, wherein at the fourth integration point a structure or schema of a local database on each of the plurality of appliances is updated, wherein a fourth of the plurality of code entities performs processing that includes updating the structure or schema of the local database on each of the plurality of appliances, and wherein the fourth code entity is invoked in said first processing by the first executable code of the upgrade infrastructure in response to the first executable code of the upgrade infrastructure reaching said fourth integration point during the first processing.

10. The method of claim 9, wherein a first of the plurality of appliances is a primary appliance including a primary copy of a system-wide database, wherein the plurality of integration points includes a fifth integration point occurring after the fourth integration point in the upgrade workflow, wherein at the fifth integration point a structure or schema of the system-wide database on the primary appliances is updated, wherein a fifth of the plurality of code entities performs processing that includes updating the structure or schema of the system-wide database on the primary appliance, and wherein the fifth code entity is invoked in said first processing by the first executable code of the upgrade infrastructure in response to the first executable code of the upgrade infrastructure reaching said fourth integration point during the first processing.

11. The method of claim 10, wherein the sixth integration point occurs after the fifth integration point in the upgrade workflow, wherein the sixth integration point corresponds to a point in the upgrade workflow after the structure or schema of the system-wide database on the primary appliance has been updated at the fifth integration point.

12. The method of claim 11, wherein the plurality of integration points includes a seventh integration point occurring after the sixth integration point in the upgrade workflow, wherein at the seventh integration point custom integration work for the first feature, service or facility is performed locally on each of the plurality of appliances after the first feature, facility or service has been upgraded on said each appliance, wherein a seventh of the plurality of code entities performs processing including said custom integration work, and wherein the seventh code entity is invoked in said first processing by the first executable code of the upgrade infrastructure in response to the first executable code of the upgrade infrastructure reaching said seventh integration point during the first processing.

13. The method of claim 12, wherein the plurality of integration points includes an eighth integration point occurring after the seventh integration point in the upgrade workflow, and includes a ninth integration point occurring after the eighth integration point in the upgrade workflow, wherein at the eight integration point a third feature, service or facility is stopped, paused or disabled, wherein at the ninth integration point an additional modification is made to the structure or schema of the system-wide database, wherein an eighth of the plurality of code entities performs processing that includes stopping, pausing or disabling the third feature service or facility which accesses the system-wide database, wherein the eighth code entity is invoked in said first processing by the first executable code of the upgrade infrastructure in response to the first executable code of the upgrade infrastructure reaching said eighth integration point during the first processing, wherein a ninth of the plurality of code entities performs processing that includes implementing the additional modification to the structure or schema of the system-wide database, and wherein the ninth code entity is invoked in said first processing by the first executable code of the upgrade infrastructure in response to the first executable code of the upgrade infrastructure reaching said ninth integration point during the first processing.

14. The method of claim 13, wherein the plurality of integration points include a tenth integration point occurring after the ninth integration point in the upgrade workflow, wherein at the tenth integration point processing is performed to migrate or transform data stored in the system-wide database from a prior version of the structure or schema to an updated version of the structure or schema in accordance with processing performed by the ninth code entity at the ninth integration point, wherein a tenth of the plurality of code entities performs processing that includes migrating or transforming the data stored in the system-wide database from the prior version of the structure or schema to the updated version of the structure or schema, and wherein the tenth code entity is invoked in said first processing by the first executable code of the upgrade infrastructure in response to the first executable code of the upgrade infrastructure reaching said tenth integration point during the first processing.

15. The method of claim 14, wherein the plurality of integration points includes an eleventh integration point occurring after the tenth integration point in the upgrade workflow, wherein at the eleventh integration point processing is performed to install a new feature, service or facility on the system, wherein the new feature, service or facility does not currently have an existing version installed on the system, wherein an eleventh of the plurality of code entities performs processing that includes installing the new features, service or facility on the system, and wherein the eleventh code entity is invoked in said first processing by the first executable code of the upgrade infrastructure in response to the first executable code of the upgrade infrastructure reaching said eleventh integration point during the first processing.

16. The method of claim 15, wherein the plurality of integration points includes a twelfth integration point occurring after the eleventh integration point in the upgrade workflow, wherein at the twelfth integration point processing is performed to configure a location of a control or management path on a selected one of the plurality of nodes of at least one of the plurality of appliances, wherein a twelfth of the plurality of code entities performs processing that includes configuring the location of the control or management path on the selected one of the plurality of nodes of the at least one of the plurality of appliances, and wherein the twelfth code entity is invoked in said first processing by the first executable code of the upgrade infrastructure in response to the first executable code of the upgrade infrastructure reaching said twelfth integration point during the first processing.

17. The method of claim 16, wherein the plurality of integration points includes a thirteenth integration point occurring after the twelfth integration point in the upgrade workflow, wherein at the thirteenth integration point processing is performed to restart any feature, service or facility previously disabled, paused or stopped in connection with any of the second integration point and the eighth integration point, wherein at the thirteen integration point processing is performed to enable one or more features, services and facilities, including the first feature, service or facility, which were upgraded in the system during the first processing by said executing the first executable code, wherein a thirteenth of the plurality of code entities performs processing that includes restarting any feature, service or facility previously disabled, paused or stopped in connection with any of the second integration point and the eighth integration point, wherein the thirteenth code entity further performs processing that includes enabling one or more features, services and facilities, including the first feature, service or facility, which were upgraded in the system during the first processing by said executing the first executable code, and wherein the thirteenth code entity is invoked in said first processing by the first executable code of the upgrade infrastructure in response to the first executable code of the upgrade infrastructure reaching said thirteenth integration point during the first processing.

18. A system comprising:
one or more processors; and
a memory comprising code stored thereon that, when executed by at least a first of the one or more processors, performs a method comprising:
defining a plurality of integration points, wherein each of the plurality of integration points is associated with one of a first plurality of workflow processing points included in an upgrade workflow;
associating each of a plurality of code entities with a corresponding one of the plurality of integration points; and
performing first processing that performs the upgrade workflow to upgrade a system including a plurality of appliances, wherein the upgrade includes upgrading a first feature, facility or service of the system from a current version to a new version, wherein the first processing further includes:
executing first executable code corresponding to the first plurality of workflow processing points, wherein a first workflow processing point of the first plurality is associated with a first integration point of the plurality of integration points; and
in response to said executing reaching the first workflow processing point corresponding to the first integration point, invoking a first of the plurality of code entities associated with the first integration point, wherein said first code entity performs first customized processing in connection with upgrading the first feature, facility or service in the system, wherein the first feature, service or facility runs during the upgrading of the first feature, service or facility, wherein the plurality of integration points includes a sixth integration point that corresponds to a point in the upgrade workflow after software of the first feature, service or facility on a primary appliance of the plurality of appliances has been upgraded from the current version to the new version, wherein the sixth integration point corresponds to a point in the upgrade workflow where the first feature, service or facility is started and executes in a compatibility mode in accordance with a runtime behavior of the current version of the first feature, service or facility, wherein a sixth of the plurality of code entities performs processing that includes starting or running the first feature, service or facility in the compatibility mode of the current version, and wherein the sixth code entity is invoked in said first processing by the first executable code of the upgrade infrastructure in response to the first executable code of the upgrade infrastructure reaching said sixth integration point during the first processing.

19. A non-transitory computer readable medium comprising code stored thereon that, when executed by a processor, performs a method comprising:
    defining a plurality of integration points, wherein each of the plurality of integration points is associated with one of a first plurality of workflow processing points included in an upgrade workflow;
    associating each of a plurality of code entities with a corresponding one of the plurality of integration points; and
    performing first processing that performs the upgrade workflow to upgrade a system including a plurality of appliances, wherein the upgrade includes upgrading a first feature, facility or service of the system from a current version to a new version, wherein the first processing further includes:
        executing first executable code corresponding to the first plurality of workflow processing points, wherein a first workflow processing point of the first plurality is associated with a first integration point of the plurality of integration points; and
        in response to said executing reaching the first workflow processing point corresponding to the first integration point, invoking a first of the plurality of code entities associated with the first integration point, wherein said first code entity performs first customized processing in connection with upgrading the first feature, facility or service in the system, wherein the first feature, service or facility runs during the upgrading of the first feature, service or facility, wherein the plurality of integration points includes a sixth integration point that corresponds to a point in the upgrade workflow after software of the first feature, service or facility on a primary appliance of the plurality of appliances has been upgraded from the current version to the new version, wherein the sixth integration point corresponds to a point in the upgrade workflow where the first feature, service or facility is started and executes in a compatibility mode in accordance with a runtime behavior of the current version of the first feature, service or facility, wherein a sixth of the plurality of code entities performs processing that includes starting or running the first feature, service or facility in the compatibility mode of the current version, and wherein the sixth code entity is invoked in said first processing by the first executable code of the upgrade infrastructure in response to the first executable code of the upgrade infrastructure reaching said sixth integration point during the first processing.

* * * * *